US010002028B2

(12) United States Patent
Andonieh et al.

(10) Patent No.: US 10,002,028 B2
(45) Date of Patent: Jun. 19, 2018

(54) DYNAMIC FEEDBACK LOAD BALANCING

(71) Applicant: ATI Technologies ULC, Markham (CA)

(72) Inventors: Joseph Andonieh, Aurora (CA); Arshad Rahman, Richmond Hill (CA)

(73) Assignee: ATI Technologies ULC, Markham (CA)

( * ) Notice: Subject to any disclaimer, the term of this patent is extended or adjusted under 35 U.S.C. 154(b) by 189 days.

(21) Appl. No.: 14/815,408

(22) Filed: Jul. 31, 2015

(65) Prior Publication Data

US 2015/0339171 A1 Nov. 26, 2015

Related U.S. Application Data

(63) Continuation of application No. 13/173,995, filed on Jun. 30, 2011, now abandoned.

(60) Provisional application No. 61/360,130, filed on Jun. 30, 2010.

(51) Int. Cl.
| | |
|---|---|
| G06T 1/00 | (2006.01) |
| G06F 9/50 | (2006.01) |
| G06T 15/00 | (2011.01) |
| G06T 1/60 | (2006.01) |
| G06F 15/16 | (2006.01) |
| G06T 1/20 | (2006.01) |

(52) U.S. Cl.
CPC ............ *G06F 9/5083* (2013.01); *G06F 15/16* (2013.01); *G06T 1/20* (2013.01); *G06T 1/60* (2013.01); *G06T 15/005* (2013.01); *G06F 2209/508* (2013.01)

(58) Field of Classification Search
CPC ..... G06T 2210/52; G06T 1/60; G06F 9/3885; G06F 9/5016; G06F 9/544; G06F 9/3877; G06F 12/109; G06F 15/167; G09G 2352/00
See application file for complete search history.

(56) References Cited

U.S. PATENT DOCUMENTS

| | | | |
|---|---|---|---|
| 5,103,393 A | 4/1992 | Harris et al. | |
| 6,292,200 B1 | 9/2001 | Bowen et al. | |
| 6,885,376 B2 | 4/2005 | Tang-Petersen et al. | |
| 6,980,209 B1 | 12/2005 | Donham et al. | |
| 7,663,635 B2 | 2/2010 | Rogers et al. | |
| 8,675,002 B1 | 3/2014 | Andonieh et al. | |
| 2004/0199732 A1* | 10/2004 | Kelley | G06F 9/3814 711/158 |
| 2005/0012749 A1 | 1/2005 | Gonzalez et al. | |
| 2005/0057571 A1 | 3/2005 | Stevens | |
| 2006/0114260 A1* | 6/2006 | Diard | G06F 15/8007 345/505 |
| 2006/0267989 A1 | 11/2006 | Campbell et al. | |
| 2006/0267990 A1* | 11/2006 | Rogers | G06T 1/20 345/502 |
| 2006/0267992 A1 | 11/2006 | Kelley et al. | |
| 2006/0271717 A1 | 11/2006 | Koduri et al. | |

(Continued)

*Primary Examiner* — Hau H Nguyen
(74) *Attorney, Agent, or Firm* — Volpe and Koenig, P.C.

(57) ABSTRACT

A method for rendering a scene across N number of processors is provided. The method includes evaluating performance statistics for each of the processors and establishing load rendering boundaries for each of the processors, the boundaries defining a respective portion of the scene. The method also includes dynamically adjusting the boundaries based upon the establishing and the evaluating.

18 Claims, 15 Drawing Sheets

(56) References Cited

U.S. PATENT DOCUMENTS

| | | |
|---|---|---|
| 2007/0136730 A1* | 6/2007 | Wilt ..................... G06F 9/3851 718/102 |
| 2008/0030510 A1 | 2/2008 | Wan et al. |
| 2008/0117217 A1 | 5/2008 | Bakalash et al. |
| 2008/0165196 A1 | 7/2008 | Bakalash et al. |
| 2008/0211816 A1 | 9/2008 | Gonzalez et al. |
| 2009/0027402 A1 | 1/2009 | Bakalash et al. |
| 2009/0160865 A1 | 6/2009 | Grossman |
| 2009/0164752 A1 | 6/2009 | McConnell |
| 2010/0060651 A1 | 3/2010 | Gala |
| 2010/0066747 A1 | 3/2010 | Diard |
| 2011/0157193 A1 | 6/2011 | Boucher et al. |
| 2011/0164677 A1 | 7/2011 | Lu et al. |
| 2012/0001925 A1 | 1/2012 | Andonieh et al. |

\* cited by examiner

Virtual to Physical Page Mapping

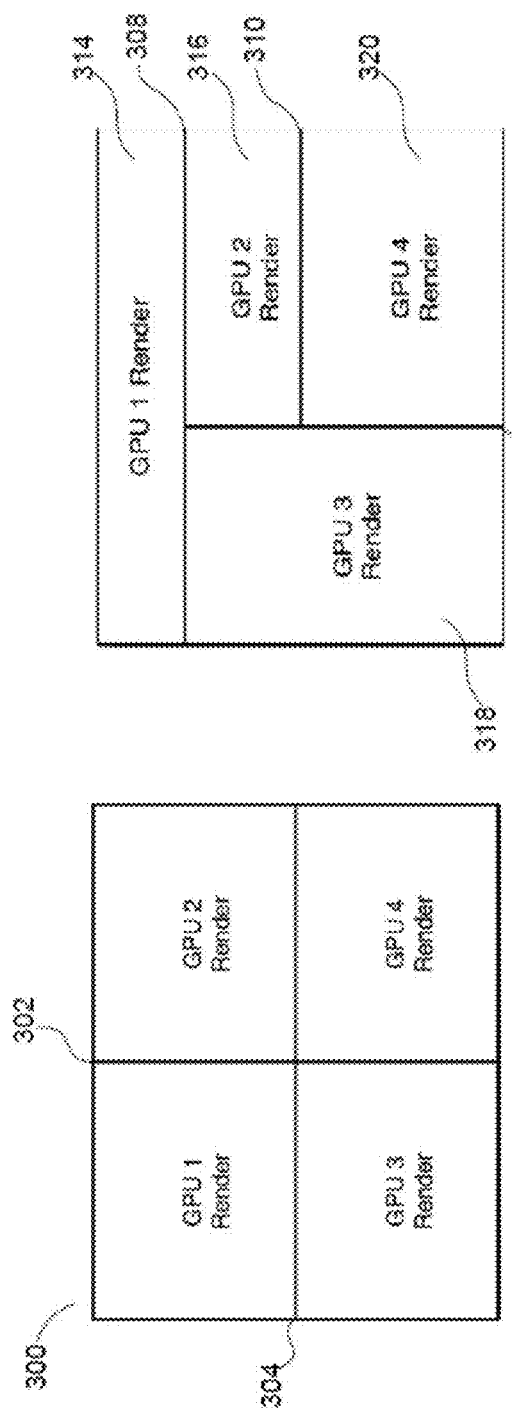
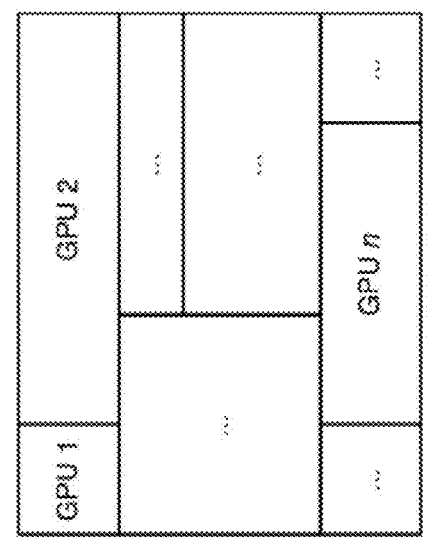
FIG. 3A
FIG. 3B
FIG. 3C

DYNAMIC FEEDBACK LOAD BALANCING

CROSS REFERENCE TO RELATED APPLICATIONS

This application is a continuation of U.S. patent application Ser. No. 13/173,995, filed Jun. 30, 2011, which claims the benefit of U.S. Provisional Application No. 61/360,130, filed on Jun. 30, 2010, which is incorporated herein by reference in their entirety.

BACKGROUND OF THE INVENTION

Field of the Invention

The present invention generally relates to processing systems. More specifically, the present invention relates to enhancing efficiencies and performance in video processing systems configured for multi-processor unit operation and capable of performing 3D rendering.

Background Art

Recent developments in conventional graphics technology have created the ability to produce extraordinarily realistic video images. In most video systems, a specialized processor is responsible for configuring these images for display on a monitor. As the realism of these images has increased, so has the amount and complexity of the information required to produce the images. Correspondingly, the performance demands on these specialized processors has also increased. To meet these increasing performance demands, display activity is no longer handled by the system's central processing unit (CPU). Instead, display activity processing is now handled by intelligent graphics cards including a specialized coprocessor known as a graphics processing unit (GPU), also called a video processing unit (VPU).

At the crux of the aforementioned developments in graphics technology is the ability to convert information stored in a processing system's memory to video signals for output to the monitor. One device commonly used to perform this conversion is known as a display adapter. In short, the display adapter creates a pipeline for the real-time conversion of graphics patterns, stored in a GPU's memory frame buffers, into the video signals output to the monitor. Additional improvements in graphics technology, however, have created the ability to combine the processing power of two or more GPU's (multi-GPUs) operating simultaneously, to produce even more realistic and more complicated images. Multiple GPUs, for example, are especially beneficial for rendering different portions of an image to respective portions of a monitor.

Specialized interfaces have been developed to connect two or more display adapters together from two or more GPUs, in a multi-GPU system, for faster graphics rendering on the monitor. These specialized interfaces, for example, enable the execution of complicated programs, such as 3-dimensional (3D) rendering applications, by multiple GPUs simultaneously. One such interface is known as CrossFire.

Even further developments have provided the ability to balance loads between these multiple simultaneously operating processors to more efficiently and more quickly render these complicated images. As performance demands have continued to increase, several shortcomings have emerged with respect to these multi-GPU rendering and load balancing solutions.

On a more technical level, existing video or graphics processing systems include the capability to drive multiple GPUs, as noted above. Using the current solutions, however, each of these multiple GPUs points to its own unique command buffer. GPU operation is driven by command buffers containing instructions that specify how the GPU is to render a scene. These buffers can be quite large, particularly on complex scenes running on powerful GPU's. Current solutions require that each GPU have its own unique command buffer, which results in large sections of duplication between these command buffers. This requires that the CPU perform at least twice as much work in order to create the unique command buffers for each GPU. As a result, the command buffers are unnecessarily duplicated. That is, when display activity commands are sent from the system's CPU, the commands are sent to multiple GPUs and/or multiple buffers, requiring at least twice the work.

Additionally, conventional graphics processing systems are significantly limited in their ability to dynamically and efficiently distribute rendering loads across multiple GPUs. Particularly, these conventional systems are unable to distribute the load in a manner that matches each GPU's capabilities to the demands of scenes displayed on respective portions of the monitor.

By way of example, consider images associated with the display of a flight simulator program. FIG. 4, for example, is an exemplary illustration of a screen shot 400 from a popular flight simulator video game. In this example, a bottom portion 402 of the screen shot 400 includes dials and controls, along with other 2-dimensional (2D) static images. A top portion 404 of the screen shot 400, however, includes a 3D rendered world consisting of many rapidly changing images. The top portion 404, therefore, will require more GPU power to render than bottom portion 402 because the bottom portion 402 is less complex. Conventional graphics processing systems cannot efficiently distribute the load across multiple GPUs to render the top portion 404 of the screen shot 400 in the manner discussed above.

Additionally, the conventional multi-GPU systems require specifically designed multi-GPU aware drivers. This awareness extends throughout the entire driver stack, increasing code complexity and development cost.

What is needed, therefore, are methods and systems to eliminate the need for duplicate command buffers in multi-GPU systems. Also needed are methods and systems that more efficiently distribute rendering loads across multiple GPUs. Additional methods and systems are needed to facilitate greater compatibility with existing multi-GPU system products.

BRIEF SUMMARY OF EMBODIMENTS OF THE INVENTION

The present invention meets the above-described needs. For example, a first exemplary embodiment of the present invention provides an approach to submit identical command buffers to multiple GPU's without the need to explicitly modify the contents of the command buffer per GPU. Since command buffers are relatively large, this approach provides a significant performance enhancement since it essentially eliminates the need to write out multiple buffers for each GPU, in which significant portions of each buffer are largely duplicated. Eliminating multiple buffer write outs applies not only to the initial CPU write, but also to command buffer patching in the kernel for each buffer, and during associated cache flushes, ultimately resulting in huge cost reductions.

A second exemplary embodiment of the present invention provides techniques to improve the performance of multi- GPU rendering by providing dynamic feed-back generated load balancing. More specifically, this embodiment provides a mechanism to improve the performance of multi-GPU rendering by dynamically adjusting the scissor orientation and coverage, or rendering ratio, based on different types of feedback. This exploits the fact that performance can often be improved by fine tuning these parameters based on images/scenes that are currently being rendered. Dynamic feed-back generated load balancing includes, among other things, the integration and aggregation of a number of different optimization components.

One optimization component includes measuring the performance of each GPU over a time window to permit fine tuning of the balance of work being distributed to each renderer. Since different areas of the screen can have differing render loads (e.g., static area on portion of screen, and heavy shader based rendering in another), direct measurement of render time makes it possible to dynamically fine-tune the configuration by redistributing the rendering load to achieve the highest level of performance on any given scene.

Another optimization component includes using pre-defined "optimal" configurations (scissor orientation, coverage, render ratio, etc) for different applications. These predefined configurations can be utilized as a starting point if the currently running application (e.g., a video game) can be determined. This is useful because it is common for different applications to have differing areas of the screen with variable render complexity.

Yet another component for achieving dynamic feed-back load balancing is the use of static region analysis for determining an initial starting configuration. Another aspect to this component includes scene change analysis. Scene change analysis determines dramatic scene changes. This in turn allows for a quicker response when substantial adjustments to the rendering profile are necessary. Scene change analysis can also be used to reset to a known optimal configuration.

Finally, a history buffer is provided. The history buffer tabulates dynamic configuration changes, permitting the intelligent creation of an optimal profile for a given application even when one has not been predefined. The history buffer can be analyzed for large screen regions of relatively stable/consistent patterns. The results of this analysis forms the basis for new rendering configurations.

A third exemplary embodiment of the present invention provides a system for achieving seamless integration of Multi-GPU rendering. As an example, this embodiment provides a mechanism whereby neither the 3D driver, nor the 3D application, has specific knowledge of whether multi-GPU rendering is occurring. This enables the 3D driver to behave the same regardless of whether multi-GPU rendering is enabled or not. More specifically, this embodiment allows the use of conventional 3D drivers that are not specifically multi-GPU aware. In the present embodiment, a kernel layer is provided that abstracts this away from these conventional drivers and sends the appropriate commands to each GPU device driver. This in turn contributes to reduced costs and complexity.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

FIG. 3A is a block diagram illustration of a conventional rendering load distribution profile;

Figure 3B:
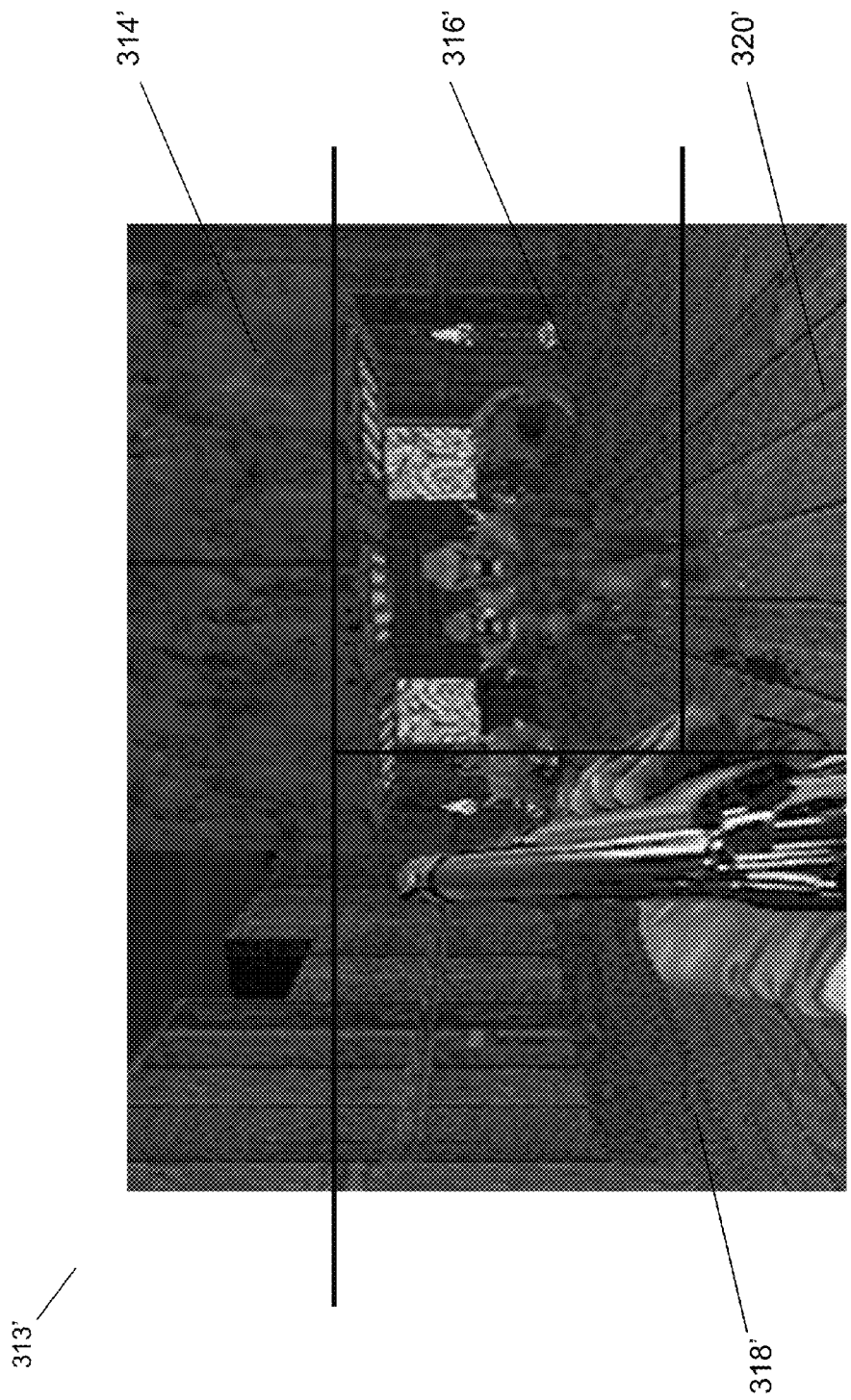
FIG. 3B is a block diagram illustration of an exemplary rendering load distribution profile in accordance with embodiments of the present invention.
Figure 4:
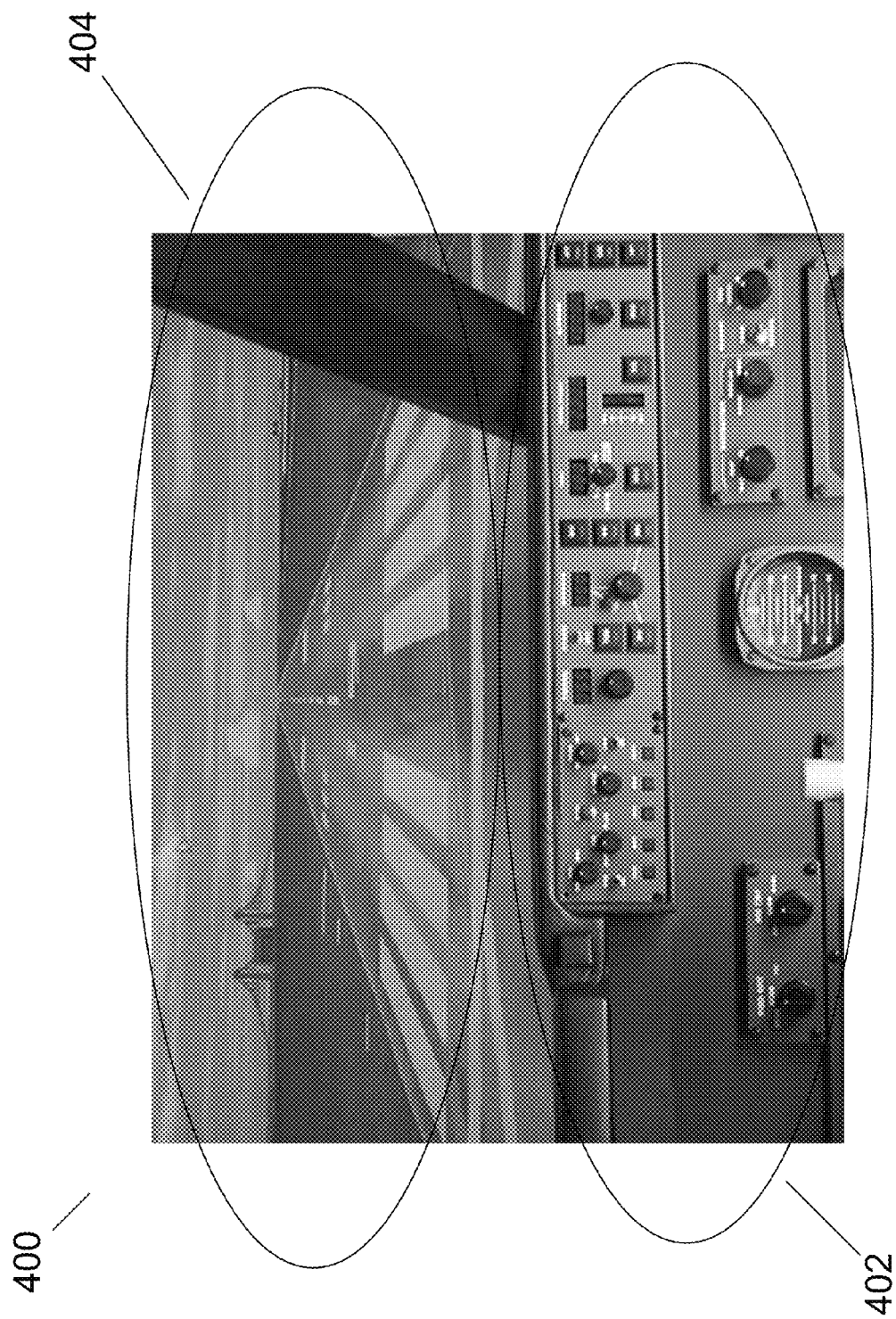
Figure 5:
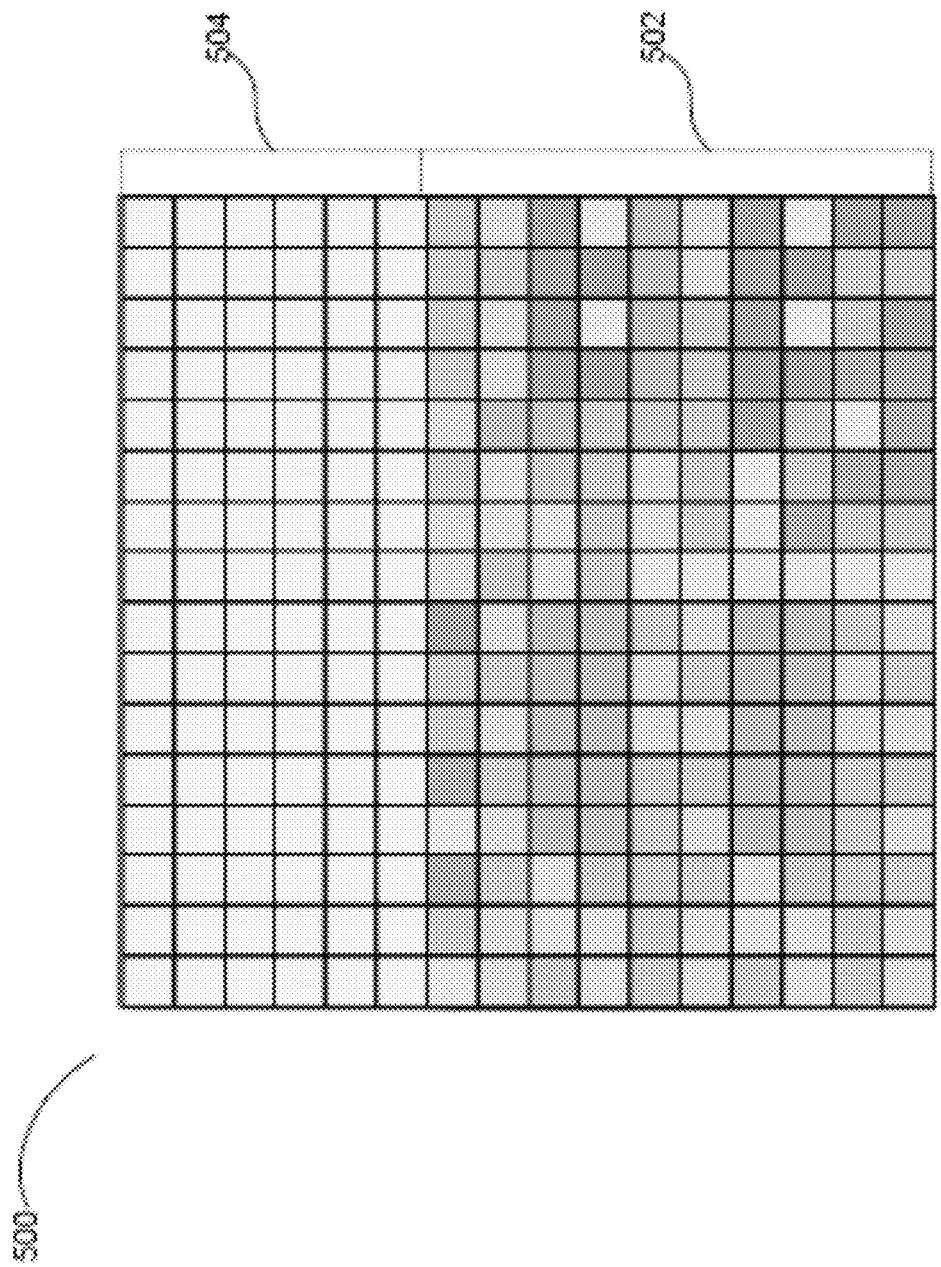
Figure 6:
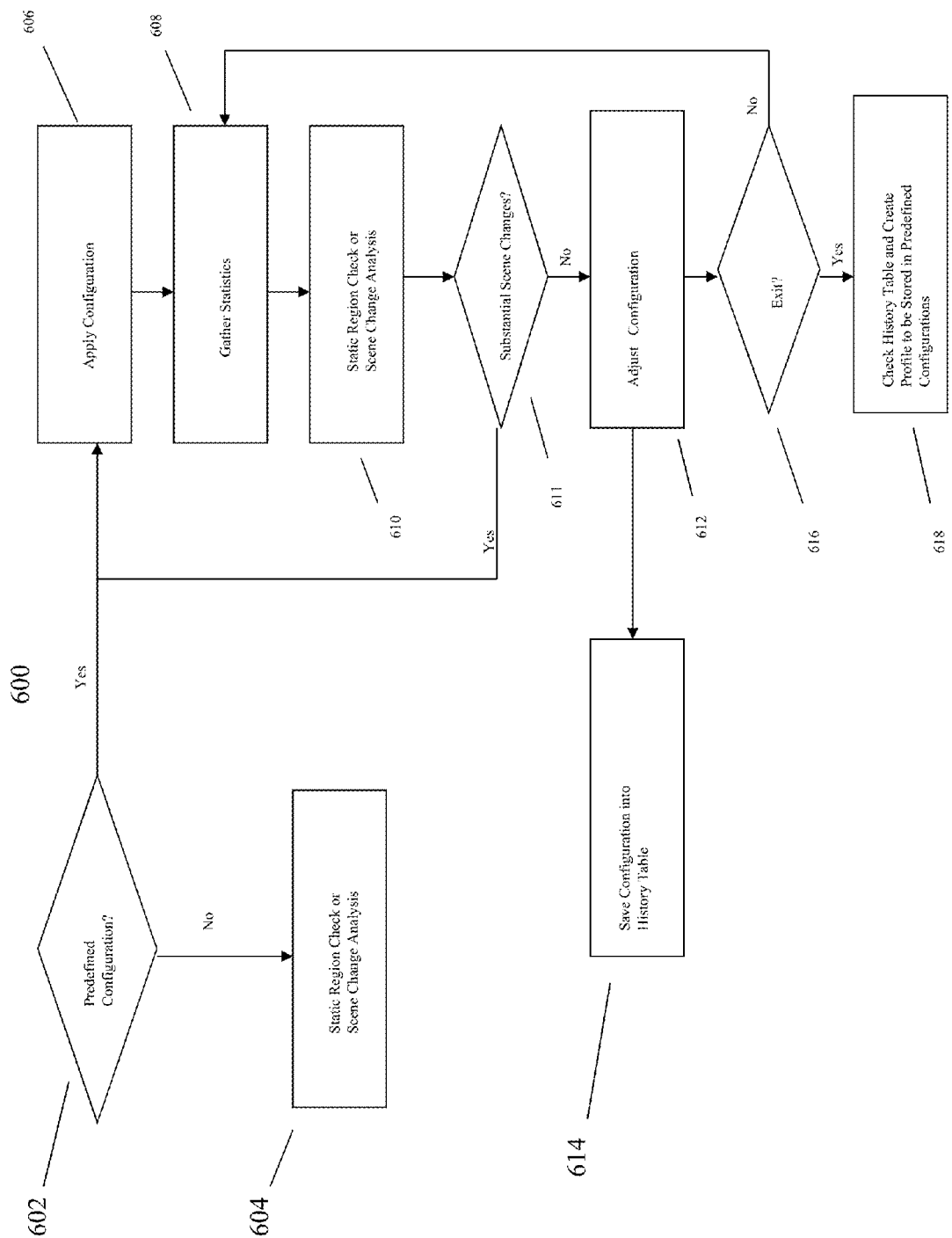
Figure 7:
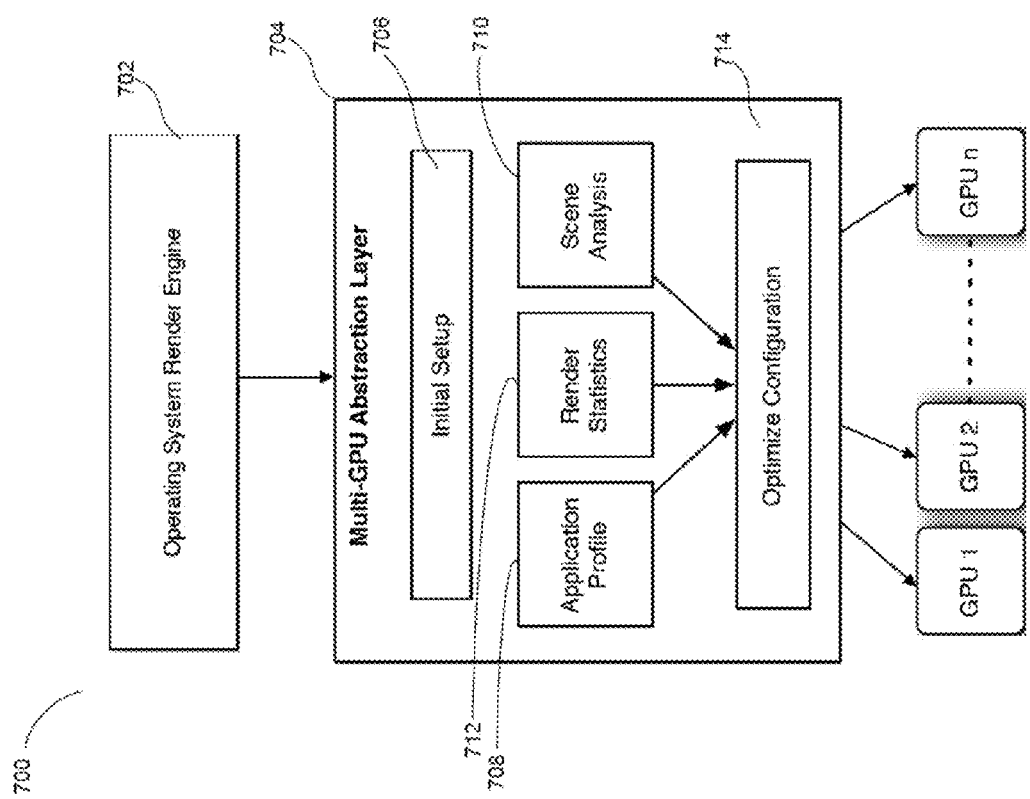
Figure 8:
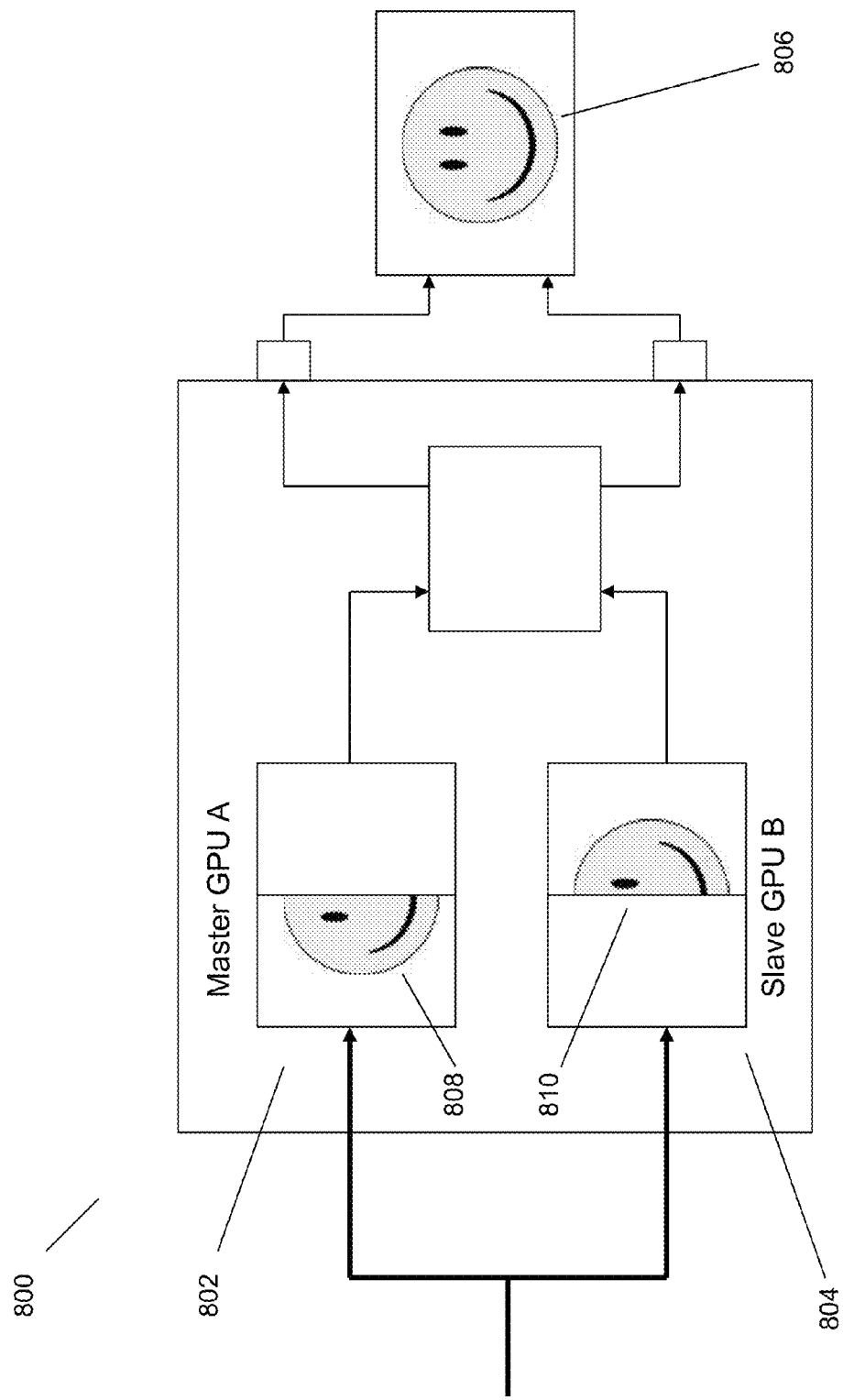
Figure 10:
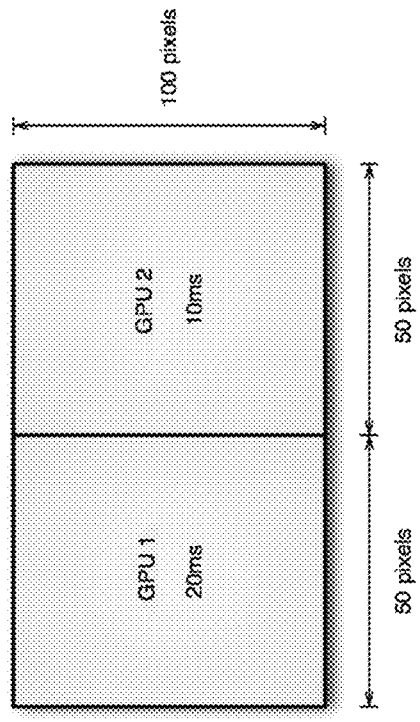
Figure 9:
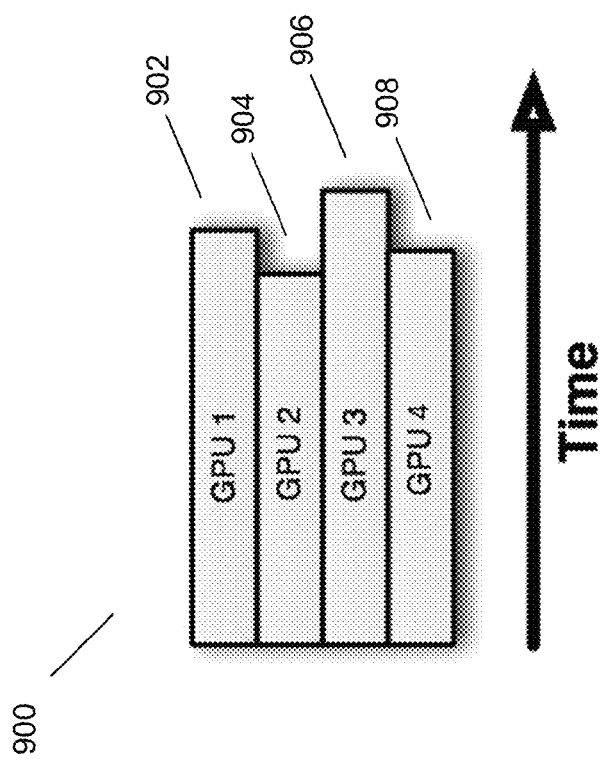
Figure 11:
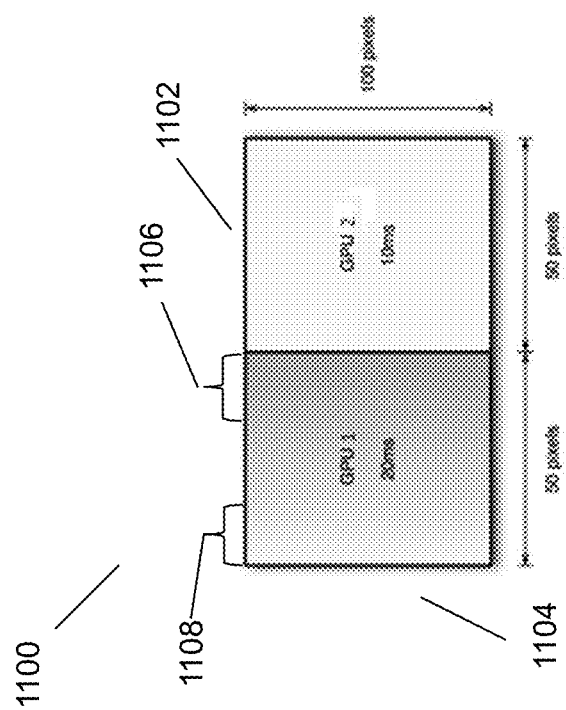

FIG. 3B' is a more detailed illustration of exemplary screen views referenced in FIG. 3B;

FIG. 3C is a block diagram illustration of an exemplary rendering scheme using N GPUs;

FIG. 4 is an illustration of an exemplary video game screen image;

FIG. 5 is an illustration of static region analysis performed in accordance with embodiments of the present invention;

FIG. 6 is a flow chart of an exemplary method for integrating GPU rendering optimizations in embodiments of the present invention;

FIG. 7 is a block diagram illustration of an exemplary system for seamlessly integrating multiple GPU rendering in accordance with embodiments of the present invention;

FIG. 8 is a block diagram illustration of a system for performing scissoring in accordance with embodiments of the present invention;

FIG. 9 is a graphical illustration of rendering times associated with multiple GPUs;

FIG. 10 is an exemplary illustration of GPU render times in relation to FIG. 9;

FIG. 11 is another exemplary illustration of GPU render times; and

Figure 12:
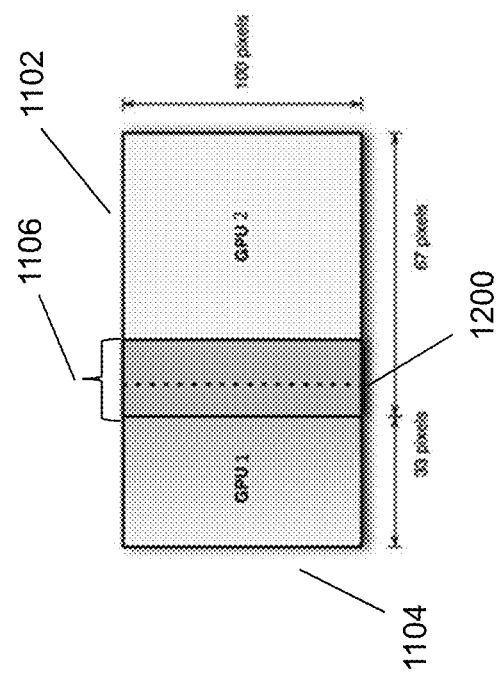

FIG. 12 is illustration of GPU render times including prediction overshoot.

DETAILED DESCRIPTION OF EMBODIMENTS OF THE INVENTION

Embodiments of the present invention enable substantially improved utilization of video processor resources. While the present invention is described herein with illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

As noted above, the present invention provides a number of techniques for enhancing efficiencies and performance in multi-processor systems. These techniques are especially beneficial in multi-GPU systems that are capable of performing complex image processing, such as 3D rendering.

Figure 1:
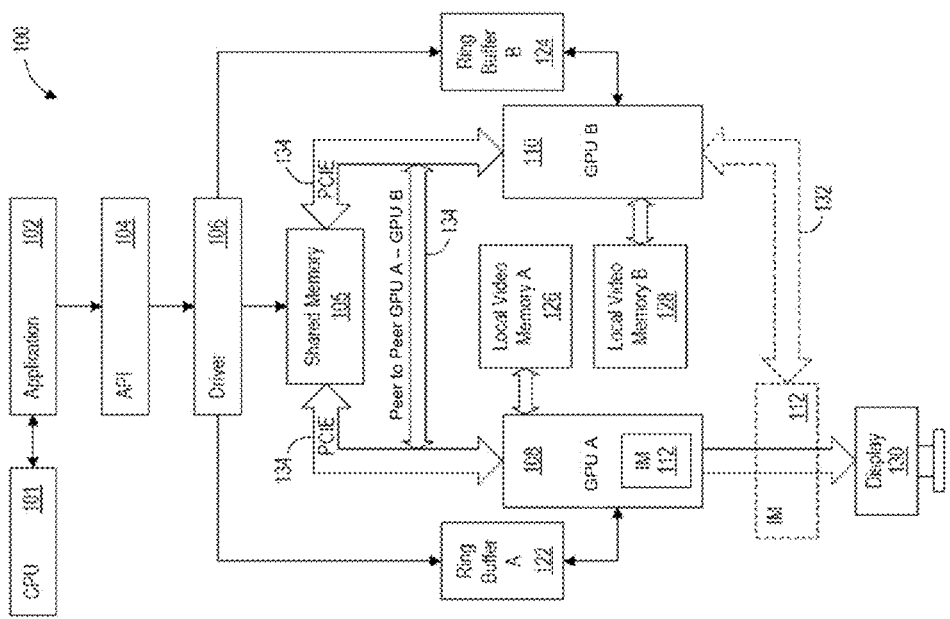
FIG. 1 is a block diagram illustration of an exemplary video system in which embodiments of the present invention can be applied.

FIG. 1 is a block diagram illustration of a video system 100 representing an exemplary environment in which embodiments of the present invention can function. The system 100 includes a CPU 101, along with other components of a video-capable computer system. An application 102, a driver 106, and a shared memory 105 reside on a host computer system, while remaining components reside on video-specific components, including one or more video cards. Alternatively, each of the one or more video cards can have a different instance of the driver with its own set of parameters, with each of these multiple drivers communicating with each other through mechanisms not limited to shared memory. Thus, embodiments of the present invention can use a single driver, or variations of multiple drivers, such as an arrangement that includes a driver instance per graphics device.

The application 102 is an end user application that requires video processing capability, such as a video game application, flights simulations or other uses. The application 102 communicates with application programming interface (API) 104. By way of example, the API 104 can be any one of the available graphics, or video, or 3D, or compute APIs including DirectX (from Microsoft), OpenGL (from Silicon Graphics), and OpenCL (from Khronos).

The API 104 communicates with a driver 106. The driver 106 translates the standard code received from the API 104 into a native format understood by the VPU components.

The system 100 also includes a VPU A 108 and VPU B 110. The VPU A 108 and VPU B 110 can be on one or more video cards, each including a video processor and other associated hardware. As understood by those of skill in the art, more than one VPU can be resident on one card or board.

VPU A 108 and VPU B 110 receive commands and data from the driver 106 through respective ring buffers A 122, and B 124. The commands instruct VPU A 108 and VPU B 110 to perform a variety of operations on the data in order to ultimately produce a rendered frame for a display 130.

The driver 106 has access to a shared memory 105. The shared memory 105, or system memory 105, is memory on a computer system that is accessible to other components on the computer system bus, but the invention is not so limited.

The shared memory 105, VPU A 108, and VPU B 110 all have access to a shared communication bus 134, and therefore to other components on the bus 134. The shared communication bus 134 can be, for example, a peripheral component interface express (PCIE) bus, but the present invention is not so limited.

VPU A 108 and VPU B 110 communicate directly with each other using, for example, a peer-to-peer protocol over the bus 134. There can also be a direct dedicated communication mechanism between VPU A 108 and VPU B 110. Local video memory 126 and 128 can be shared.

VPU A 108 and VPU B 110 each have a local video memory 126 and 128, respectively. By way of example, one of the VPUs functions as a master VPU and the other VPU functions as a slave VPU, but the invention is not so limited. The multiple VPUs could be peers under central control of another component. VPU A 108 can act as a master VPU and VPU B 110 can act as a slave VPU.

Various coordinating and combining functions are performed by an interlink module (IM) 112 that is resident on a same card as VPU A 108. This is shown as IM 112 enclosed with a solid line. In such an embodiment, VPU A 108 and VPU B 110 communicate with each other via the bus 134 for transferring inter-VPU communications (e.g., command and control) and data. For example, when VPU B 110 transfers an output frame to IM 112 on VPU A 108 for compositing, the frame is transferred via the bus 134.

The IM 112 is not resident on a VPU card, but is an independent component with which both VPU A 108 and VPU B 110 communicate. VPU A 108 and VPU B 110 perform at least some communication through an IM connection 132. For example, VPU A 108 and VPU B 110 can communicate command and control information using the bus 134 and data, such as frame data, via the IM connection 132.

As noted above, embodiments of the present invention can be implemented in an environment such as the video system 100. The present invention, however, is not limited to this particular environment. The embodiments of the present invention include approaches for providing a unified command buffer. Embodiments of the present invention also include dynamically balancing rendering loads and seamlessly integrating multi-GPU rendering into existing video processing systems. Each embodiment is addressed in greater detail below.

Aspects of the present invention can be implemented in the kernel driver layer of system memory without requiring knowledge of a multi-GPU render configuration in either the application or a client side 3D driver layer. Additionally, this implementation uses feedback of render performance to calculate the orientation and render coverage or ratio for each GPU. The present invention, however, is not limited to this particular approach.

Efficient Approach for a Unified Command Buffer

Figure 2A:
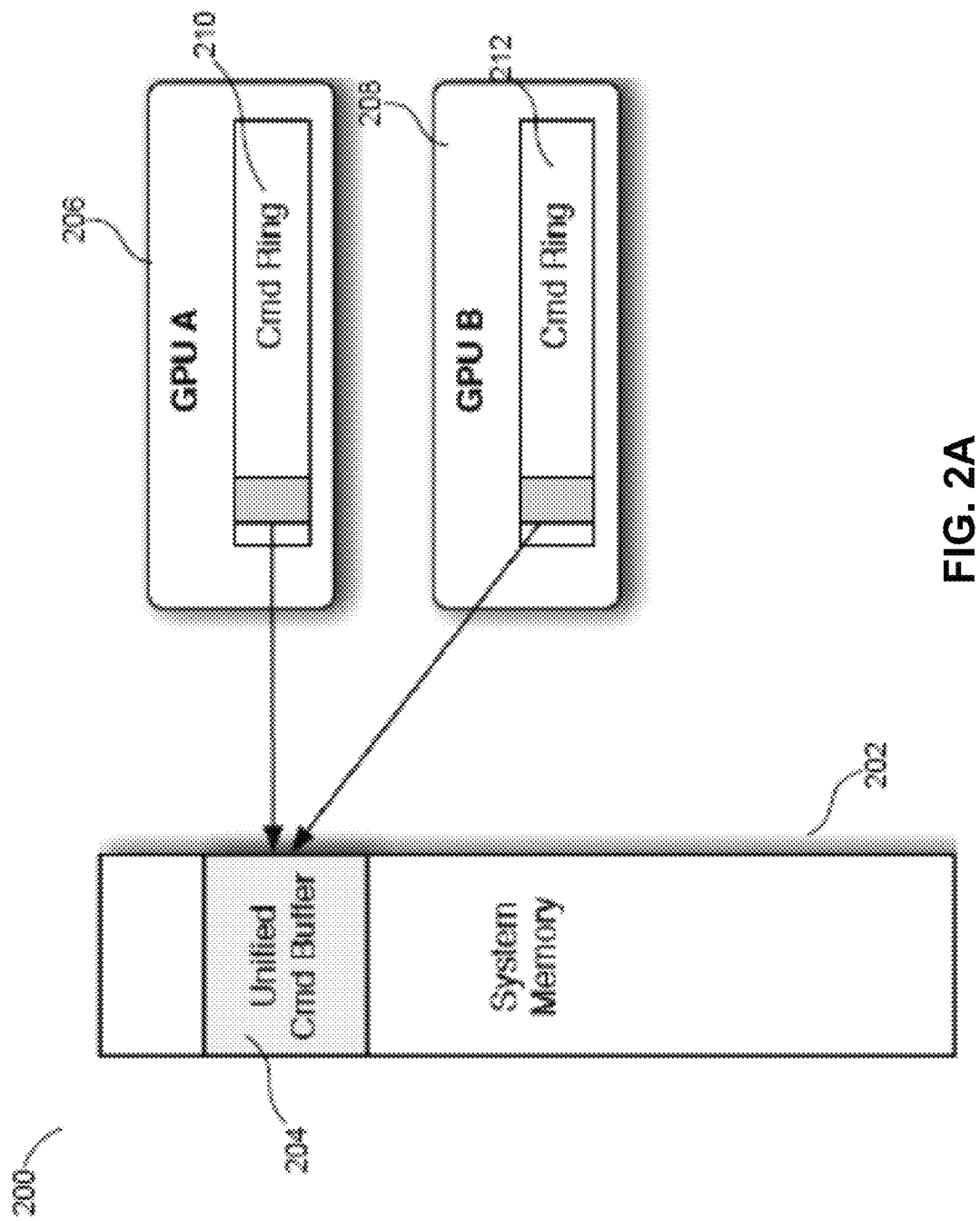
FIG. 2A is a block diagram illustration of a unified command buffer constructed in accordance with embodiments of the present invention.

The present invention provides methods and systems directed at eliminating the need for duplicate command buffers in multi-processing environments, such as multi-VPU or GPU systems. FIG. 2A is an illustration of one exemplary embodiment.

FIG. 2A is a block diagram illustration of a processor memory system 200. More specifically, FIG. 2A is an exemplary illustration of a mechanism to submit the same command buffer to multiple processors, such as GPUs, without the need to generate unique command buffers for each respective GPU. This approach provides significant performance enhancements over conventional approaches. For example, given the size of a typical command buffer, there are significant benefits to embodiments of the present invention by eliminating the need to process, analyze, and modify multiple command buffers and their associated use of resources, such as textures and data buffers.

The system 200 includes a system memory 202, that includes its own unified command buffer 204. A first GPU A 206 and a second GPU B 208 are configured to access the unified command buffer 204. The first GPU A 206 and the second GPU B 208 respectively include command ring buffers 210 and 212. Each of these GPUs accesses the unified command buffer 204.

By way of background, in conventional multiple GPU systems, separate commands are provided to each GPU.

These separate commands instruct each of the GPUs to perform a particular task (e.g., draw a particular triangle). To perform these tasks in these conventional systems, each of the GPUs must point to and accesses a separate local memory, or command buffers, within a larger system memory.

The system 100 can be configured to operate as a conventional multi-processor system. When configured conventionally, the VPU A 108 points to a local memory A 126 and the VPU B 110 points to a separate local memory B 128. This need to point to separate memories exists because there are differences in where things are stored within the shared memory 105. This conventional approach requires more memory, and therefore, greater chip real estate. This approach also increases memory access times, decreasing system performance.

The exemplary embodiment of the present invention, as illustrated in FIG. 2A, increases the efficiency of multi-processor configurations, such as the multi-processor arrangement in system 100 of FIG. 1.

By way of example, the command buffer 204 of FIG. 2A includes the use of conditionals (e.g., conditional executions). These conditionals include predications (i.e., predicated instructions). The predications loosely anticipate whether instructions received within the command buffer 204 are associated with (i.e., intended for or matched with) GPU A 206, or on the other hand, are associated with GPU B 208.

The predications also facilitate the use of the same command buffer across multiple GPUs. The predications can stipulate, for example, if particular received instructions are associated with GPU A 206, then a first set of corresponding commands are fetched to perform a first set of tasks. On the other hand, if particular received instructions are associated with the GPU B 208, then a second set of corresponding commands are fetched to perform a second set of tasks.

The predications provide a type of tagging for each instruction within the command buffer 204. This tagging indicates whether the instruction is designated for the GPU A 206 or the GPU B 208. In this manner, although all of the instructions may be received by each processor, on the processor tagged to receive the particular instruction (e.g., GPU A 206 or GPU B 208) will actually read the instruction. Although FIG. 2A illustrates the use of two GPUs, the present invention is not so limited. The present invention is also not limited to GPUs. Instead of multiple GPUs, the processor function could be implemented as CPUs, VPUs, or VPU/CPU/GPU combinations.

The exemplary system 200 of FIG. 2A, can be implemented within the kernel driver layer of the system memory 202. The kernel driver ensures that the objects located in VRAM are located identically for all GPUs with the exception of the frame buffer and the address-remapping table.

Reserving specific ranges in VRAM reserves the same ranges in all GPUs. For example, location 0-10 in N number of GPUs have the same array. Each 4 bytes (i.e., each integer in each location) represents a particular GPU. In the example of FIG. 2A, GPU A 206 is associated with location 0, GPU B 208 is associated with location 1 etc. The memory of all other GPUs at that location would be 0. The predicates, discussed above, utilize this process. Within the kernel driver, ranges of VRAM are allocated, one for each GPU (e.g., GPU A 206 and GPU B 208). Each range contains a Boolean array of size "number of GPUs participating" (N), called GPU[0 . . . N−1], such that only one position in the array is true (1) and all the other places are false (0). That is, GPU[i]==1 if and only if the GPU index is i (i=0 . . . N−1: I represents the GPU index).

Reserving specific VRAM ranges also ensures the same VRAM map for all GPUs and provides portions of the code that only a particular GPU will execute. Consider the example of a video game that includes a wall scene, textured with a specific pattern of stones. The textured pattern will be stored in the same virtual memory locations across all GPUs. Therefore, if a command is submitted to GPU A 206, it goes to this same memory location and accesses the same texture. This process of reserving VRAM ranges reduces the need to store duplicate content in multiple command buffers.

An additional aspect of the unified command buffer technique of the present invention relates to remapping table entries. More specifically, remapping table entries are mapped to the same locations in the remap tables on all the GPUs. The remap table points to the system memory, and not to the local memory of the GPU.

A remap table, discussed in greater detail below, is a system memory view of each of the GPUs. By way of example, if GPU A is configured to read a texture from remap table address 10000, the address 10000 in the remap table points to a physical address of the system memory (e.g., value 0x1234ABCD). If the same command is executed on GPU A and GPU B, GPU B also sees a command that is trying to read a texture at address 10000 in the remap table. In this case, the same content of the entry 10000 must be placed in the GPU B (i.e. the value 0x1234ABCD). If this content is not also placed in the GPU B, GPU B will read a different texture.

Another feature of the command buffer techniques provided in the present invention includes sharing command buffer retirement information between all GPU instances. This process is aided by synchronized commands. As understood by those of skill in the art, synchronized commands include the concept of command retirement, meaning that completed commands are time stamped to indicate time of their completion. In the present invention, before a command buffer can be reused, command retirement time stamps are examined to determine whether the commands have been completed.

Desirably, all GPUs receive the same command timestamp values, with the same command buffer being submitted to all GPUs. By way of one example, this can be achieved when (a) GPU i writes its retirement timestamp to retirement buffer entry i, and (b) a client will not retire the command buffer until all timestamps have retired (i.e., all GPU's are finished with the command buffer), even when using a single GPU instance.

Figure 2B:
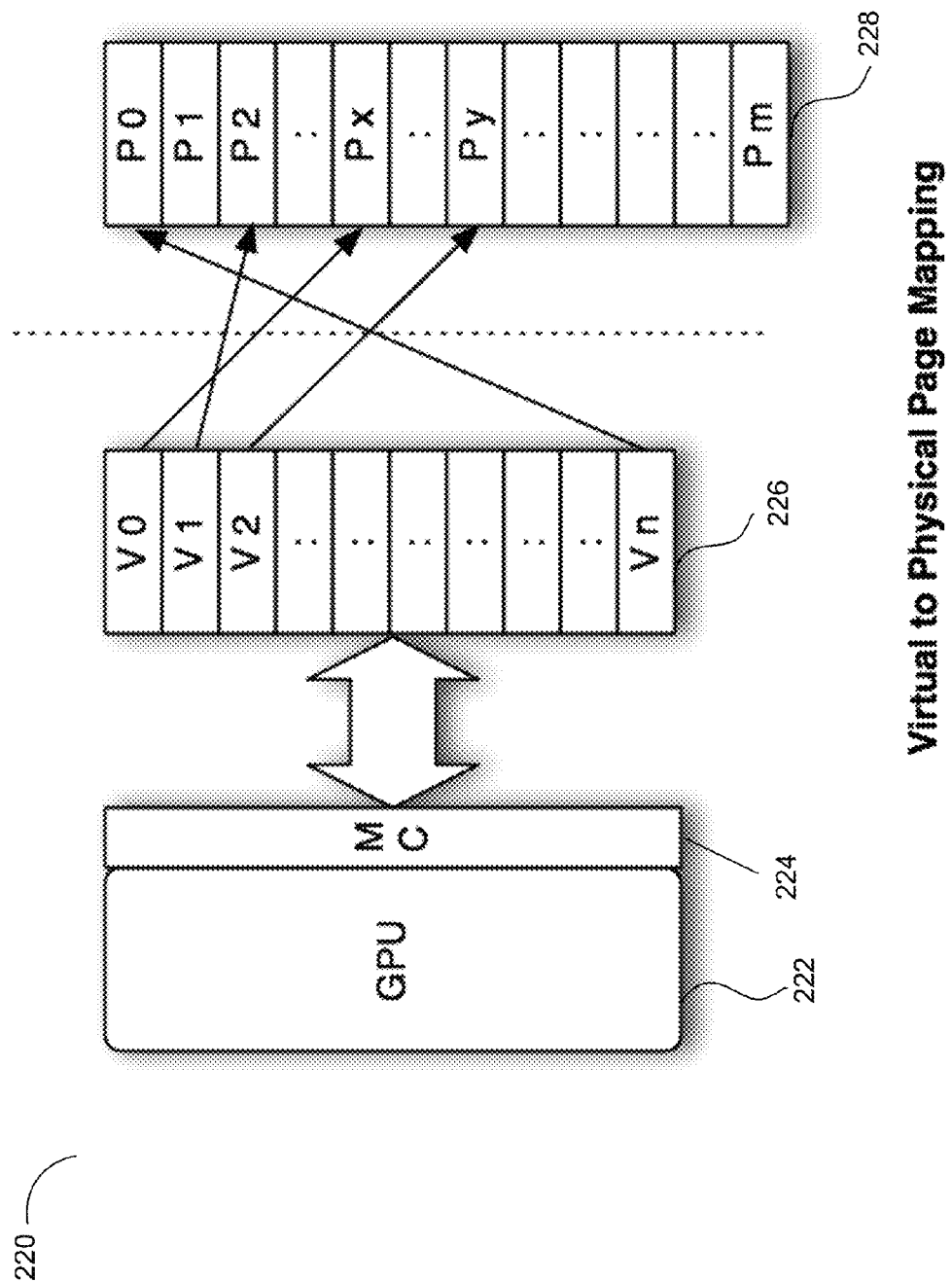
FIG. 2B is a block diagram illustration of an exemplary virtual to physical page mapping configuration in accordance with an embodiment of the present invention.

FIG. 2B is a block diagram illustration of an exemplary virtual to physical page mapping configuration 220 in accordance with an embodiment of the present invention. The virtual to physical page mapping configuration 220 is one exemplary approach to implementing virtual memory (VM) in a multi-GPU environment.

In the present invention, as noted above, at least two different GPUs can reference the same unified command buffer. This unified command buffer in-turn references the same underlying resources, such as textures etc. Each GPU, however, does not have to reference the same physical resource (i.e., memory space). The virtual to physical page mapping configuration 220 of FIG. 2B is one exemplary approach for submitting a single command buffer with a single virtual address with the underlying physical resources being located at different physical addresses.

The exemplary virtual to physical page mapping configuration 220 of FIG. 2B includes a GPU 222 coupled to a memory controller 224. When the GPU 222 makes a memory request, the memory request travels through the memory controller 224 and through a respective virtual mapping mechanism, such as a virtual mapping table 226. The virtual mapping table 226 includes virtual entries (V0-Vn). Each of the virtual entries (V0-Vn) are mapped to a respective page (P0-Pm) of a physical memory 228. The physical memory 228 can be associated with a physical command buffer or can be associated with some other physical resource.

The pages (P0-Pm) of the physical memory 228, however, need not be contiguous or in the same order as the virtual entries (V0-Vn). In the exemplary configuration 220, the virtual mapping mechanism 226 returns the physical address of the requested memory to the memory controller 224. This physical address can then be used to access a respective page (P0-Pm) of the physical memory 228.

Figure 2C:
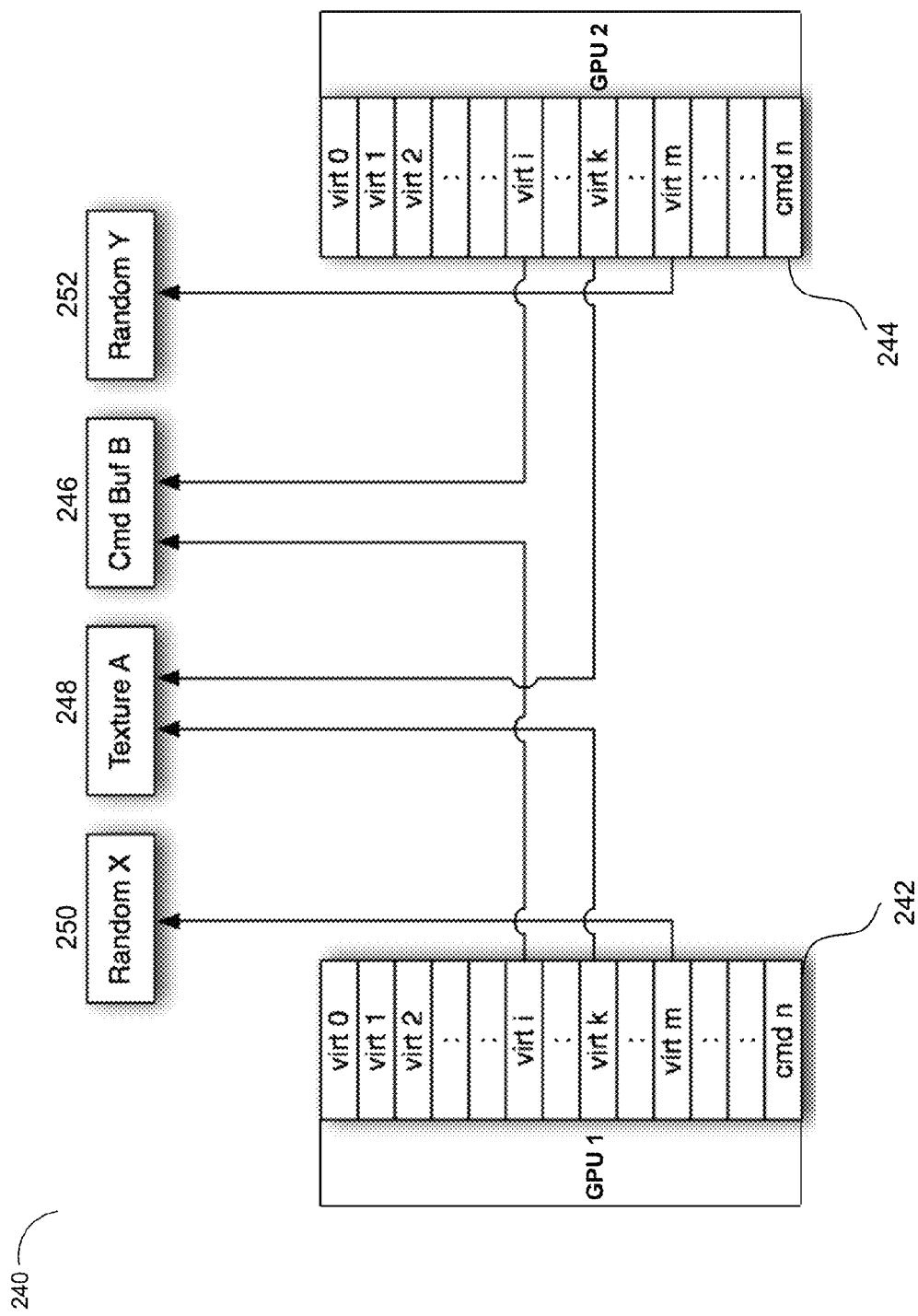
FIG. 2C is a block diagram illustration of a multi-GPU scenario arrangement.

FIG. 2C is an exemplary block diagram illustration of a multi-GPU VM scenario 240 structure in accordance with embodiments of the present invention. In the VM scenario 240, each GPU has its own VM table. To utilize a unified command buffer with as little predication as possible, it is desirable to use the same addresses for resources that are referenced in the command buffer. These addresses can be physical addresses, as noted above with reference to FIG. 2A. Alternatively, as discussed in relation to FIG. 2B as discussed above, these addresses can go through a VM table.

The VM scenario 240 includes VM table 242 and VM table 244. The VM table 242 is associated with a GPU 1 and the VM table 244 is associated with a GPU 2. Each of the VM tables 242 and 244 include virtual addresses that can refer to any resource. In the exemplary illustration of FIG. 2C, however, each of the virtual addresses in the VM tables 242 and 244 refers to at least one physical memory resource. Exemplary physical memory resources include command buffer B 246 and texture A 248. By way of example, texture A 248 can be an image that is being referenced somewhere else within the command buffer B 246, such as an instruction to "load the texture at this address." Other physical objects, illustrated as random X 250 and random Y 252 in FIG. 2C, can also be referenced by the VM tables 242 and 244. Random X 250 and random Y 252 can include, for example, vertex buffers, other textures or command buffers, or any other resource.

As an example, entry 'i' in VM table 242 points to the same physical memory object as entry 'i' in the VM table 244. Any address that is referenced in the command buffer B 246, is desirably mapped in the same way on the VM table 242 and the VM table 244. Addresses in either of the VM table 242 or the VM table 244 that are not referenced in the command buffer B 246, can point to other locations.

In FIG. 2C, the same address Virt i on VM tables 242 and 244 points to the same command buffer B 246. Virt k on each of the VM tables points to the same texture A 248. However, Virt m which is not used by the command buffer B 246, can be used by GPU 0 and GPU 1 to point to different physical resources.

In the embodiment of the present invention illustrated in FIG. 2C, the resources pointed to by the VM tables 242 and 244 are not required to be the same physical memory location. They can be different physical memory locations as long as the content is the same. For example, it is sufficient that the same texture is loaded in local memory on two different GPUs as long as Vi, for example, points to its own unique instance of that texture.

Figure 2D:
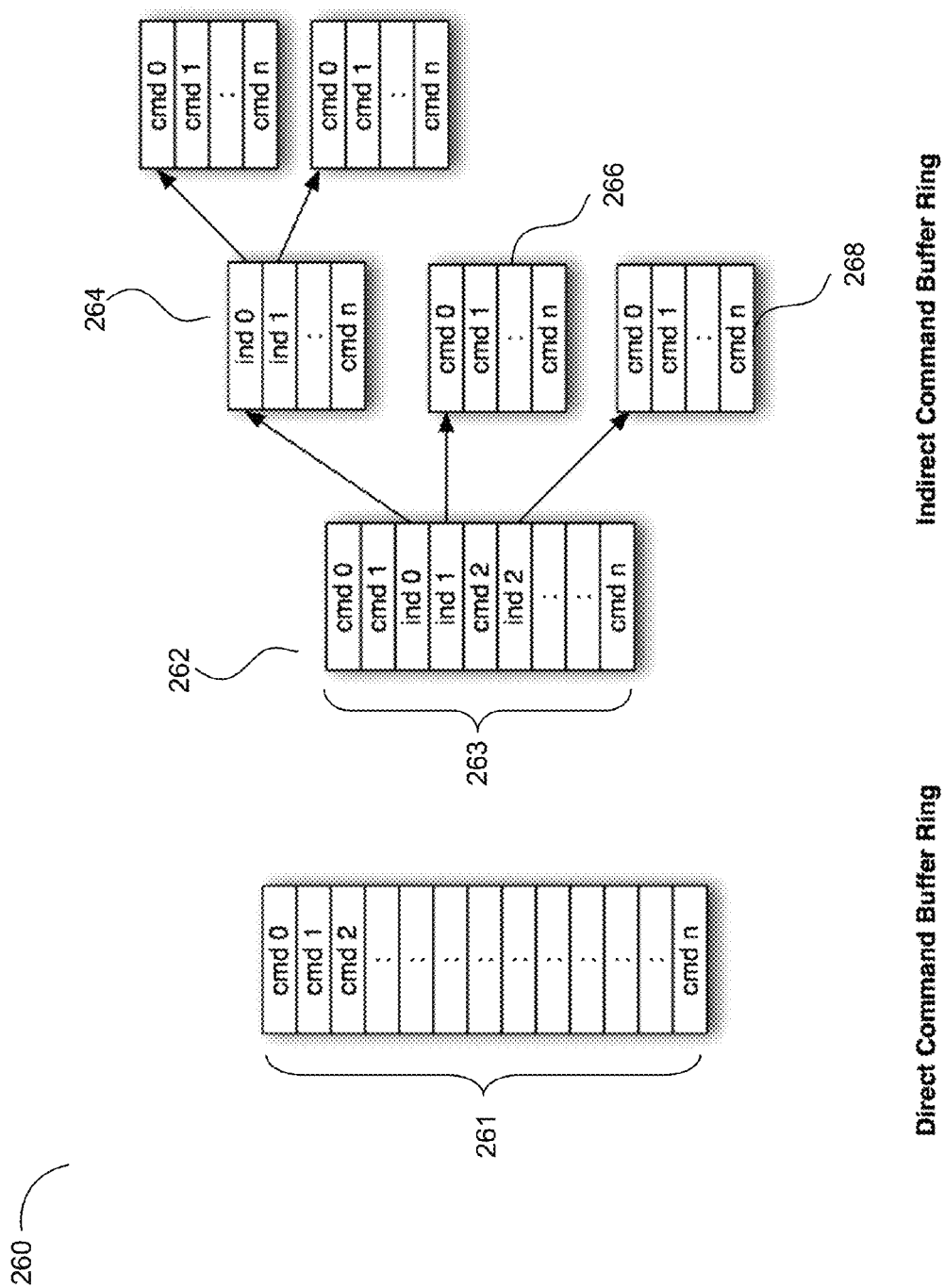
FIG. 2D is a block diagram illustration of direct vs. indirect command buffer rings structured in accordance with embodiments of the present invention.

FIG. 2D is an exemplary illustration of direct vs. indirect command buffers rings structured in accordance with embodiments of the present invention. In FIG. 2D, for example, a direct command buffer ring 260 is shown. The term direct implies that the command ring buffer 260 includes all instructions and data needed for operations within the ring buffer 260. For example, the command buffer ring 260 includes an instruction list 261, which includes direct commands cmd0-cmdn that are used for operations within the command ring buffer 260.

Also shown in FIG. 2D is an indirect command buffer ring 262. Indirect command buffers, such as the command buffer ring 262, are buffers that include indirect references to other command buffers. For example, the indirect command buffer 262 includes an instruction list 263, which includes direct commands cmd0-cmdn. The instruction list 263 also includes indirect references ind0-ind1. The indirect references ind0-ind1 further point to indirect command buffers 264, 266, and 268, each including other indirect references allowing for multiple levels of indirection. The concept of having an indirect buffer is one approach for simplifying implementation of unified command buffer discussed above.

Figure 2E:
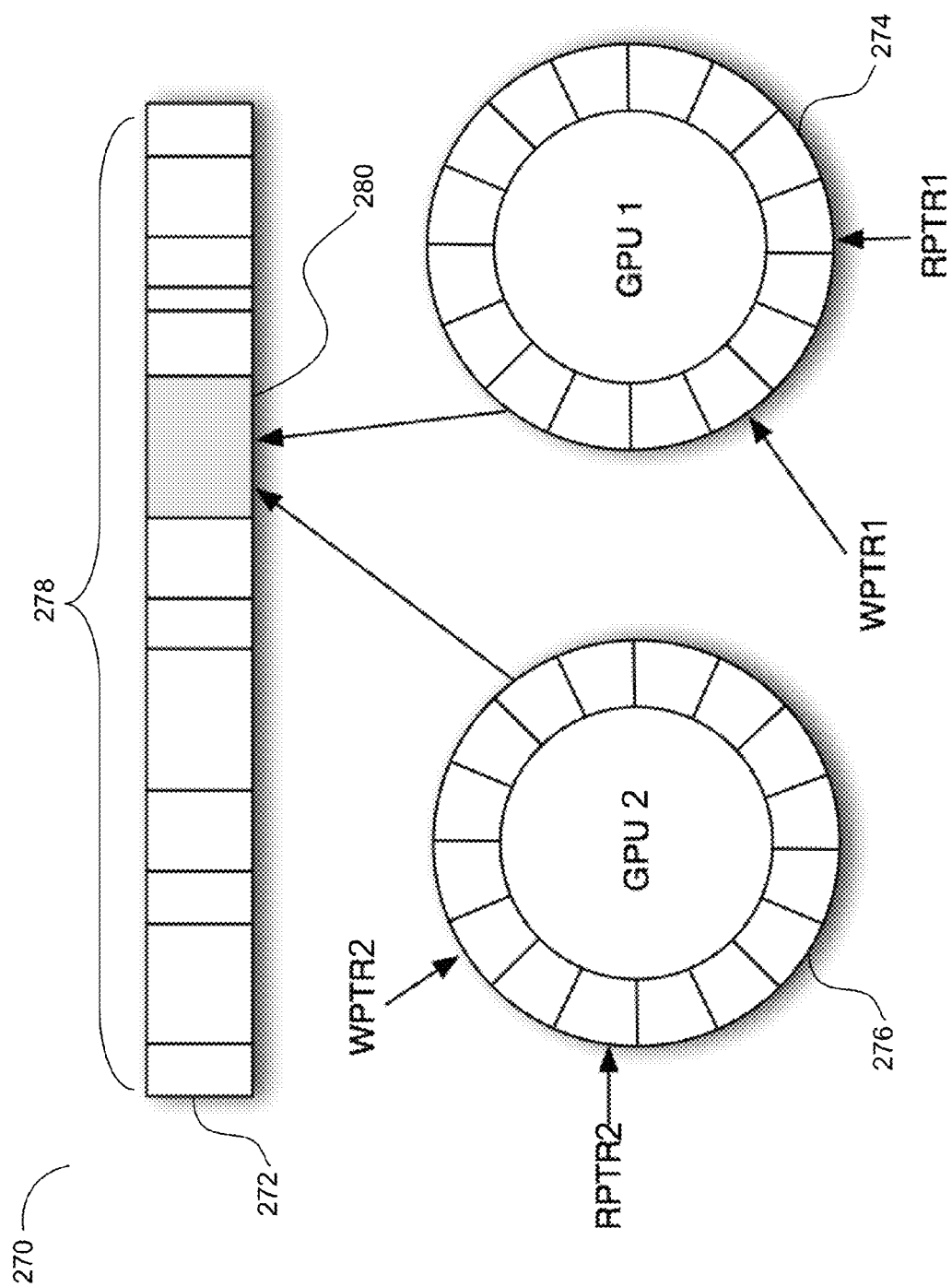
FIG. 2E is a block diagram illustration of a multi-GPU ring buffer configuration constructed in accordance with embodiments of the present invention.

FIG. 2E is an exemplary illustration of a multi-GPU Ring buffer configuration 270 constructed in accordance with embodiments of the present invention. The configuration 270 includes a system memory 272, a first GPU (GPU 1) and a second GPU (GPU 2). GPU 1 is associated with ring buffer 274 and GPU 2 is associated with ring buffer 276. The system memory 272 includes system resources 278, which could be, as an example, additional command buffers.

During operation, GPU 1 and GPU 2 fetch from ring buffers 274 and 276, respectively. Additionally, GPU 1 has its own read and write pointers RPTR1 and WPTR1, respectively. GPU 2 also has its own read and write pointers RPTR2 and WPTR2, respectively. As the system CPU (not shown) fills a ring with new commands, it updates the respective write pointer. As GPU 1 and GPU 2 fetch from their respective ring buffers 274 and 276, they update their associated read pointers. Each GPU runs asynchronously to the other, and may have differing workloads even when presented with the same command buffer due to predication. Therefore, it is desirable that each GPU maintains its own read pointer.

In FIG. 2E when using indirect commands, different entries in command buffet rings 274 and 276 can actually point to the same resource within the system memory 272, such as resource 280. As discussed above with reference to FIG. 2D, it is sufficient if the memory content at different physical locations is identical. In this manner, it is not required that different entries point to the same physical location. This approach is utilized when implementing a unified command buffer in embodiments of the present invention.

Dynamic Feedback Load Balancing

A second embodiment of the present invention provides techniques to improve the performance of multi-processor rendering (e.g., GPUs) by dynamically adjusting scissor orientation and coverage, or rendering ratio, based upon different types of feedback. This second embodiment exploits the notion that performance can be improved by fine tuning and adjusting multi-GPU rendering profiles based upon parameters from scenes currently being rendered.

In a multi-GPU system, the CPU determines how to efficiently distribute the task of rendering an image (i.e., rendering load) to each of the individual GPUs in the system. FIG. 3A is an illustration of a conventional approach for performing load rendering in a multi-GPU system.

More specifically, FIG. 3A includes a conventional scheme 300 for distributing the rendering load across four GPUs (1-4) configured for multi-GPU rendering. The conventional scheme 300 represents a video screen displaying an image, with each of the GPUs 1-4 rendering a respective portion of the image to a corresponding portion of the screen.

In the scheme 300, for example, the rendering task has been divided into foul chunks distributed equally across GPUs 1-4. Here, the term equally denotes the positioning of respective vertical and horizontal rendering boundaries 302 and 304, which collectively determine the portion of the rendering load each GPU performs to render the image on the screen. Each of the GPUs 1-4 in the scheme 300 renders an equal portion of load (i.e., processes an equal portion of the image for display on the screen). One goal of a multi-GPU system, such as the 4-GPU system in the scheme 300, would be that by efficiently distributing the rendering task across the four GPUs, the rendering process would be four times faster. Conventional systems, however, rarely achieve this level of efficiency.

The second embodiment of the present invention provides an improved technique for distributing the rendering load across N number of GPUs at significantly higher levels of efficiency than achieved in conventional systems. This embodiment also provides an approach to fine-tune the rendering boundaries. This fine tuning enables the boundaries to be established based more upon the availability/capability of particular ones of the GPUs instead of merely dividing the load evenly, as performed in the scheme 300 of FIG. 3A.

In the present invention, load balancing efficiency is increased by measuring the performance of each GPU over a time window, allowing for fine tuning of the balance of work being distributed to each renderer (e.g., each GPU). Since different areas of the screen, or monitor, can have differing render loads (e.g., static area on portion of screen, and heavy shader based rendering in another), direct measurement of render time makes it possible to dynamically fine-tune the rendering scheme to achieve the highest level of performance on any given scene. For any given scene, different areas of the scene can require different amounts of time to complete the rendering.

The precise amount of time required to render any given pixel or region of pixels, within a scene, is based upon many factors. These factors can include, but are not limited to, (a) number of times a given area is overdrawn, (b) number and type of operations performed within that area, (c) complexity, length and instruction composition of programmable shaders being used for that area, and (d) performance level of the associated GPU.

In more precise terms and by way of example, the render time for a GPU i (Ti) takes into account all factors, including the performance level of GPU i, scene complexity in that portion of the scene, etc. For example, if a frame within a scene is partitioned into n segments, the total rendering time for the frame is equivalent to the longest render time Ti amongst the n GPU's rendering the frame.

Moving ahead several figures, FIG. 9 is a graphical illustration 900 of rendering times required by four GPUs to render respective portions, or partitions, of a frame from a scene. Bars 902-908, for example, are representative of the amount of time respective GPUs 1-4 require to render their portion of the frame. The longer the bar, the longer the respective portion of the scene required to render. The entire frame is considered to be completed only when all portions have been fully rendered. In the example of FIG. 9, the total render time for the scene is gated by GPU 3.

In an embodiment of the present invention, if any GPUs [0 ... n] is allowed to sit idle while waiting for another GPU to finish rendering, the distribution of work in this example is less than optimal. By way of example, optimal performance is achieved when the render time for each of the n GPUs is substantially equivalent. This equivalent work distribution can be achieved by adjusting the partition size allocated to each of the n GPUs such that render time is equivalent for each partition.

Consider the following example. Frames within a virtual scene (e.g., within a video game) can change to simulate movement of a camera in an actual scene. As the camera moves, areas of scene complexity also change relative to where they are being rendered. Rendering these areas of complexity requires constant adjustment of GPU partitions. Thus, continuous recalculation of optimal partitioning size (i.e., partitioning across the GPUs) is needed.

These recalculations are performed in a manner that will not unnecessarily burden a particular GPU or CPU. An unnecessary burden on a particular GPU or CPU would ultimately reduce performance.

Generally, there is spatial locality in scene complexity over a short time period (a few frames). Over a longer period of time (e.g., one second or more), the scene can change sufficiently such that regions of scene complexity change significantly. Conventional approaches for accommodating these scene changes include, for example, adjusting partition size by a single row or column of pixels every frame. This approach, however, can only achieve optimal partitioning size over a large number of frames, and only if the scene complexity does not significantly change over this entire period.

Embodiments of the present invention accommodate changes in scene complexity by performing a coarse grained prediction of the partition size. Predicting the partition size helps to optimize partitioning within a "single render frame" period of time. In one exemplary approach to quickly predicting optimal partitioning sizes, an average render time per pixel (within a given partition) is determined.

As used herein, the average cost per pixel is the average time required to render a pixel within a given partition. Knowledge of the dimensions of a partition, and the time required to render that partition, makes it possible to calculate the cost of rendering a single pixel within the same partition. This average cost, along with recorded render times for each partition, facilitate a quick approximation of ideal partition sizes.

In the embodiment, the average cost per pixel ($C_i$) is equal to render time ($T_i$) for the given partition ($P_i$) divided by total area ($A_i$) being rendered by GPU i. Here, $W_i$=Width of $P_i$, $H_i$=Height of $P_i$, $A_i = (W_i * H_i)$, and $C_i = T_i/A_i$. Total Area of all partitions: $A = \text{sum}(A_0 \ldots An_{n-1})$ In one example, calculating the optimal time (where T is equivalent for all partitions), and knowing the average cost per pixel in each partition is based upon the following expression where $T = A/\text{sum}(1/C_0 \ldots 1/C_{n-1})$. For example, given two GPUs, where each GPU renders an equal area (50×100 pixels), it may be determined that GPU 1 takes twice as long as GPU 2 to render its portion of the scene, as illustrated in FIG. 10. This difference can be attributed to the complexity of the render in the partition or the relative performance levels of each GPU.

Given this information, it is possible to calculate the optimal rendering time:

$$T = A/\text{sum}(1/C_1 + 1/C_2)$$
$$= (100*100)/(5000/20 + 5000/10)$$
$$= 10000/(15000/20)$$
$$= 13/33 \text{ ms}$$

Knowing T permits calculation of the optimal partitioning area for GPU 1 and GPU 2 based upon the expression $A_i=T/C_i$:

$$A_1=13.33/(20/5000)=3332 \text{ pixels}$$

$$A_2=13.33/(10/5000)=6665 \text{ pixels}$$

By leaving the height unchanged at 100, partition $A_1$ is calculated to be 33×100 pixels and $A_2$ is calculated to be 67×100 pixels. This particular technique can be applied for any N number of partitions.

Although the approach above offers a good first-pass approximation, different pixels, and regions of pixels within Pn, can have varying rendering costs due to non-uniform complexities across the partition. Consequently, slight inaccuracies can occur in the approximation, ultimately resulting in a suboptimal tender load determination for each GPU.

FIG. 11 is an exemplary illustration 1100 of uneven rendering costs occurring within a particular partition. In the illustration 1100, the rendering of every pixel within a partition 1102 associated with GPU 2 has the same render cost. In rendering pixels in partition 1104, associated with GPU 1, the pixels closer to right side 1106 have a higher cost than the pixels on left side 1108.

The approach discussed above, as applied to the illustration 1100 of FIG. 11 to achieve an optimal rendering load, would have resulted in a prediction of 33 pixels for the partitioning of GPU 1 (1104). The approach above would have predicted 67 pixels for GPU 2 to render partition 1102. However, since the cost of rendering pixels on the right side 1106 are higher, the prediction would have been inaccurate, as illustrated in FIG. 12. Therefore, when the newly adjusted partitions are rendered, it will be noted that GPU 2 will require more time to render than the calculated time T and GPU 1 will require less time to render than the calculated time T.

Based upon the new rendering time information, and knowing the time required to render the original partition 1104, the average cost per pixel of the region 1106 can be determined, in isolation from the perspective of each GPU.

$T_2$=Time taken to render $P_2$ in frame 1
$T_2'$=Time taken to render $P_2$ in frame 2

$$\Delta T_2 = T_2 - T_2'$$

A=Area of $P_2$ in frame 1
A'=Area of $P_1$ in frame 2

$$\Delta A = A - A'$$

With this information, the average cost per pixel of the isolated delta region 1106 can be determined from the perspective of GPU 2:

$$C_2 = \Delta T_2/\Delta A$$

Similarly, the average cost for this region from the perspective of GPU 1 can be determined:

$$C_1 = \Delta T_1/\Delta A$$

Based upon the information above, the new $C_1$ and $C_2$ from the perspective of each GPU, can be determined. By way of example, the actual adjustment can be the midpoint between the two predicted partition points, as illustrated by dotted line 1200 shown in FIG. 12. Each subsequent frame will result in a smaller delta error region, resulting in higher accuracy for the average cost per pixel for the region 1106, allowing for a more accurate prediction of partitioning for ensuing frames.

On the other hand, if there are regions of the screen that remain static from one frame to the next, the information derived from the approach above can be used to determine the optimal orientation for the partitioning to reduce the potential error in the adjustment calculation. By way of example, adjustment errors can occur because pixels that were added or removed from a partition were not equal to the average cost per pixel for that partition. A substantial difference, for example, can result in a significant error. Static portions of the screen have a fixed complexity, i.e., they do not vary from frame to frame. Incorporating static portions in a partition means that fewer pixels are changing in that partition, and hence the average cost per pixel calculation can be more accurate.

Identifying static regions, for example, facilitates optimal selection of partitioning orientation to reduce adjustment errors. Creating and applying application specific profiles can similarly be used to suggest an initial optimal partition orientation that might produce the lowest numbers of errors. This could be significant, for example, in a flight simulator where the bottom half of the screen showing an instrument panel might ordinarily result in the selection of vertical partitions, thus incorporating the static portion in each of the partitions.

In another example, where the static portion is on the right side of the screen, horizontal partitions might be chosen to again incorporate the static portion in each of the partitions.

FIG. 3B is an illustration of an exemplary rendering load distribution scheme in accordance with an embodiment of the present invention. The load distribution scheme of FIG. 3B provides an efficient approach for distributing the rendering load across each of the GPUs 1-4 through the use of fine-tuning. Of note, the distribution scheme of FIG. 3B is not divided into equal portions as those shown in FIG. 3A. Instead, the load distribution scheme of FIG. 3B dynamically changes in accordance with changes in any given scene.

In FIG. 3B, exemplary rendering boundaries 308, 310, and 312 are shown. The CPU 101 determines the most optimal load distribution among the GPUs 1-4 to render a complete scene to the screen. The exemplary rendering boundaries 308, 310, and 312 reflect this distribution.

In the scheme of FIG. 3B, for example, GPU 1 renders a portion 314 of the scene defined by the rendering boundary 308. As an example, the portion 314 might represent a hallway portion of a scene in a video game. GPU 2 renders a portion 316 of the scene defined by the rendering boundaries 308, 310, and 312. The portion 316 might represent, for example, a static right-side wall-portion scene from the same the video game. Similarly, GPU 3 renders a portion 318 of the scene defined by the rendering boundaries 308 and 312. The portion 318 can represent a static left-side wall-portion scene from the same video game. GPU 4 renders a portion 320 of the scene defined by the boundaries 310 and 312.

FIG. 3B' provides a more detailed graphical illustration of the various screen views referenced above in relation to FIG. 3B. FIG. 3B' includes an exemplary screen 313' from a commercial video game to illustrate the various demands placed upon individual GPUs in a multi-GPU environment. In FIG. 3B', portions 314', 316', 318', and 320' correspond to the screen portions 314, 316, 318, and 320 of FIG. 3B, respectively. By way of example, the screen portion 314', rendered by the GPU 1, is a more static (i.e., less complicated) portion of the screen.

By contrast, the screen portion 316' of FIG. 3B', rendered by the GPU 2, is changing and more complicated to render, including many moving images. Thus, in rendering the video game scene, GPU 2 has a heavier work load than GPU 1. Similarly, the screen portion 318', rendered by GPU 3, includes a first person shooter perspective, which is changing and more complicated than the screen portion 314'. The screen portion 320' is similar to the screen portion 314' in that it is also a less complex static portion of the screen.

Embodiments of the present invention have the ability to distribute and dynamically adjust the rendering work load across the various GPUs 1-4 based upon changing scene requirements, such as those illustrated in FIG. 3B'. Many other factors, however, can influence the rendering load distribution. For example, GPU 4 could be inherently more powerful than GPU 1, and therefore better suited to render more complicated scene portions.

FIG. 3C is an illustration of an exemplary rendering scheme 322 using N number of GPUs. In FIG. 3C, for example, any number of GPUs 1-n can be used to perform scene rendering. When N number of GPUs are used, embodiments of the present invention can be used to distribute and dynamically adjust the rendering work load across each of these GPUs.

Several exemplary techniques can be used to implement the dynamic feedback load balancing aspects of embodiments of the present invention mentioned above. One such approach includes the use of predefined "optimal" configurations. Optimal configurations (e.g., scissor orientation, coverage, render ratio, etc.) can be established, for example, where a screen portion remains static for substantial periods of time.

FIG. 4 is an illustration of an exemplary video game scene 400 used to demonstrate concepts of the present invention. In FIG. 4, for example, a bottom portion 402 of the scene 400 remains largely static during execution of a flight-simulator application. A top portion 404 includes the more complicated scene of a changing landscapes, as observed from the cockpit of a flight simulator.

One optimal GPU configuration to efficiently distribute the rendering workload across multiple GPUs can be used where largely static views, such as the bottom portion 402, are used for substantial portions of the scene. These largely static views present a significantly smaller GPU rendering load than more active and complicated images, such as the top portion 404 of FIG. 4. A different approach, discussed in greater detail below, is used to establish an optimal GPU rendering configuration for rendering the top portion 404.

Therefore, in the case of optimally configuring N number of GPUs to render the screen shot 400 of FIG. 4, the smaller GPU load required to render the bottom portion 402 can be considered. For this particular flight simulator application, for example, one optimal configuration (i.e., partitioning scheme) for N number of GPUs to render all of the screen shots might apportion a less powerful GPU to render the bottom portion 402, each time the bottom portion 402 appears. This less powerful GPU would essentially be dedicated to rendering the more static bottom portion 402, along with any other less complicated screen shots. This approach is particularly useful where different applications occupy differing areas of the screen with variable render complexity.

In the present invention, the optimal partitioning configuration for rendering the portion 402 can be dynamically adjusted based upon either the number of GPUs available, or the power of individual one of these GPUs. Additionally, this particular example configuration can become the baseline for this fight simulator, with a predefined profile that is dynamically adjustable based upon real-time feedback.

In yet another embodiment of the present invention, a static region analysis can be performed to determine the optimal rendering configuration when N number of GPUs are used. A static region analysis is a technique for analyzing a screen currently displaying an image. This analysis can be used to determine screen portions that may be more active (e.g., the portion 404) from screen portions that may be more static (e.g., the portion 402). Although used to distinguish active from static, static region analysis is used primarily to more quickly identify static screen regions. Thus, static region analysis is one more tool that can be used to dynamically distribute the rendering load across N number of GPUs in embodiments of the present invention. Static region analysis can be used to determine a starting point, or baseline, for establishing a rendering configuration in the absence of predefined optimal configurations.

FIG. 5 is an illustration of an exemplary screen 500 where static region analysis can be applied in accordance with an embodiment of the present invention. By way of example, the screen 500 (e.g., 1600×1200 pixels, 1280×960 pixels, 1024×768 pixels, etc.) is shown subdivided as 16×16 pixel blocks for purposes of illustrating the application of static region analysis. The present invention, however, is not limited to 16×16 pixel block regions as any suitable pixel array scheme can be used. The sub-dividing enables a more efficient analysis to identify which (a) screen regions include more movement or other changes and (b) which regions include less movement and/or are more static.

In FIG. 5, a region 502 contains more changes, representing a larger GPU rendering load. A region 504 contains fewer changes, representing a smaller GPU rendering load. A number of techniques, known to those of skill in the art, are available for performing the actual analysis of the regions 502 and 504 of FIG. 5. One such technique is known as the sum of absolute differences (SAD), which is widely used to perform motion estimation for video processing. SAD entails comparing blocks of one or more original pixels from a video frame with blocks of one or more pixels from an ensuing frame. An absolute value of the comparison is used to assess the amount of change within the particular portion of the screen related to the block of pixels. In the case of the present invention, SAD can be used, for example, to identify screen regions with the lower amounts of change.

In FIG. 5, for example, pixels from a current frame of the region 504 are compared, or subtracted, with pixels from one or more ensuing frames of the region 504. The more similar they are, the closer the delta is to 0. The absolute of this delta for each pixel in the block is determined, and all the values are summed. This sum represents the level of change for this block. The more pixels that deviate, and the larger the deviation, the larger the resultant sum. In other words, the higher the absolute value number, the greater the degree of movement or change within the region 504.

Pixels from one frame of the region 502 are compared with pixels from one or more ensuing frames of the same region 502. The sum of absolute differences for this region is also calculated.

In the example of FIG. 5, the region 504 might represent the image of a control panel within a video game with very little movement. The region 502 might represent a dynamic section of the screen within respect to movement, such as the scene 318' of FIG. 3B' representing a first person shooter. In FIG. 5, therefore, the SAD from the region 502 will be higher than the SAD from region 504, indicating very little movement. Therefore, by using static region analysis, the conclusion can be drawn that the region 504 is relatively static.

Knowledge of the static regions within the exemplary scene 500, for example, can be used to select from a predefined set of rendering profiles having at least one profile that matches a scene of interest. In the absence of a predefined rendering profile, a suitable profile can be determined on the fly based upon the results of the static region analysis. By way of illustration, for the example screen of FIG. 5, GPU 1 may be defined to render the first 6 rows of the frame and GPU 2 may be defined to render Pixels 7 through 16.

Another technique that can be used in conjunction with static region analysis, in multi-GPU rendering load balancing, is scene change analysis. Scene change analysis is also well known to those of skill. In embodiments of the present invention, however, scene change analysis is used as another tool to efficiently distribute the rendering load, in a multi-GPU environment across each of the GPUs. Scene change analysis is a statistical analysis of pixel data related to a scene taken from the same vantage point but at different times. This information is used to determine whether objects in one frame of a scene are present in ensuing frames of the same scene. An absence of these objects in the ensuing scenes represents a complete change in the scene.

With respect to scene change analysis, consider the exemplary scene of a first person shooter in a video game running down a corridor. Next, as the shooter reaches the end of this corridor, assume they leap from a window, inside of the corridor, into a helicopter. When the scene changes from a shooter traveling down a corridor (i.e., lots of movement and changes) to a helicopter cockpit (i.e., more static), a substantial portion of the bottom half of the screen becomes a static control panel (see, e.g., the bottom portion 402 of FIG. 4). In this example, since the scene has totally changed, the GPU rendering load, therefore, has also changed. The challenge at this point becomes dynamically reconfiguring the GPU rendering load distribution to match the load rendering requirements of the newly changed scene.

By way of review, to reconfigure the GPU rendering load distribution, it will become necessary to adjust the rendering boundaries between the GPUs (see, e.g., the boundaries 302, 304, 308, 310, and 312 of FIG. 3C). As noted above, these boundaries correlate specific areas of the screen with respective GPUs for purposes of rendering. In the example above, the use of scene change analysis makes this adjustment and correlation process more efficient.

More specifically, scene change analysis helps avoid merely incrementally moving (i.e., fine tuning) the rendering boundaries when a scene has substantially changed, as in the case of the example above with the first person shooter and the helicopter. In embodiments of the present invention, when substantial scene changes occur, the current GPU load rendering scheme can be abandoned in favor of a more optimized or predefined rendering profile.

An exemplary rendering profile could be an XML format of data in the following form:

```
<App>
<name>XYZ</Name>
```

```
<Scene>
<Signature> <Hash Code of SAD profile not limited only to that>
< Signature>
<Config2>
<GPU        1>x00,y00,     x01,y01      </GPU    1>
<GPU        2>x10,y10,     x11,y11      </GPU    2>
</Config2>
</Config3>
<GPU        1>x00,y00,     x01,y01      </GPU    1>
<GPU        2>x10,y10,     x11,y11      </GPU    2>
<GPU        3>x20,y20,     x21,y21      </GPU    3>
</Config3>
```

One additional optimization technique, used in embodiments of the present invention, includes a configuration history table to track the changes and adjustments that occur to the GPU load rendering profile, in real-time. That is, as the rendering boundaries, such as the boundaries 302, 304, 308, 310, and 312, are adjusted up/down, left/right etc. to accommodate changes in the GPU rendering load distribution, these changes are tacked and tabulated.

By way of example, when a video game is running, such as the first person shooter helicopter example above, the rendering profiles are dynamically created and/or adjusted to more efficiently distribute the rendering load across the multiple GPUs. As these rendering profiles are created and/or adjusted, they are tracked and tabulated in a history buffer. As the video game continues to run, this history table is updated with the new and/or updated rendering profiles.

Following some predetermined period of time, entries to the history table can be reviewed to determine whether any of the tabulated rendering profiles were more prevalent or dominant during execution of the video game than any of the other rendering profiles. More specifically, the history table can be analyzed to determine which, if any, of the tabulated profiles, were used more than others. The results of this analysis can be applied to future uses of the video game.

For example, it can be helpful to know whether the rendering load was split equally across all of the GPUs 90% of the time. It may also be of use to know whether a particular one of the GPUs was performing at a particular level or in a predictable manner. This information can be saved in the history table and, upon exit from the game, a new and more efficient rendering profile can be developed based upon this tabulated information.

Additionally, each user may have their own style of playing the game. Using the history table feature of embodiments of the present invention, each time a user plays the video game, the system learns and capitalizes on that user's style and experience, correlating this information into adjustments to the rendering profile for subsequent uses of the video game by the same user.

FIG. 6 is a flow chart of an exemplary method 600 for integrating the use of the aforementioned GPU rendering optimizations into embodiments of the present invention. The method 600 is desirably performed in real-time during execution of an application program, such as a video game.

In step 602 of the method 600, a determination is made as to whether a pre-defined optimal configuration has already been established. If a predefined configuration has not been established, a static region analysis or scene change analysis is performed in step 604 to determine an efficient initial GPU rendering configuration. If, on the other hand, a predefined rendering configuration has been established, this predefined rendering configuration can be applied in step 606 to a displayed scene based upon user-defined priorities.

In step 608 render statistics are gathered in real-time and stored to assist in determining an appropriate rendering load for each GPU within the multi-GPU configuration. These statistics can include, by way of example, frames per second, (e.g., number of flips), GPU Load (i.e., how much of the time the GPU is loaded); GPU Idle time per second (i.e., the amount of time the GPU stayed Idle or performs no work), number of commands retired per second (i.e., the number of commands the GPU can complete), etc. The render statistics of step 608 can be used to apply a new partitioning profile.

Step 610 represents the application of an additional rendering profile optimization tool. In step 610 another static region or scene change analysis can be used to determine whether more substantial scene changes than those identified by the statistics in step 608, have occurred. If substantial changes have occurred in the presently displayed scene, as indicated in step 611, a new partitioning configuration is developed and applied (see, e.g., step 606). If the static region or scene change analysis of step 610 determines that substantial scene changes have not occurred, fine tune adjustments are made to the rendering scheme, as indicated in step 612, and this information is saved in the history table, as shown in step 614.

If the video games has finished, as indicated in step 616, the process exits and the history table is checked to determine whether a dominant configuration existed for a large duration of the game. If a profile can be identified, this profile is saved as a predefined profile, as shown in step 618. If the vide game has not finished, the process returns to gathering statistics at step 608.

Seamless Integration of Multi-GPU Rendering

As noted above, a third embodiment of the present invention provides techniques for performing seamless integration of multi-processor rendering. More specifically, a mechanism is provided whereby neither the 3D driver nor the 3D application have specific knowledge of multi-GPU rendering, which permits the use of turn-key drivers.

In conventional systems, application programs, such as video games, write to a render engine requesting the performance of one or more tasks. These tasks can include, for example, a request that a particular object be drawn, a particular 3D scene be built, or to render a specific scene in a particular location. These requests are typically forwarded to a hardware driver and then to a single GPU. The driver converts the requests to commands the GPU can understand, and then forwards the commands to that GPU.

In embodiments of the present invention, this driver functionality is largely abstracted, so that instead of sending the commands to a single GPU, the commands are sent to N number of GPUs. The present application refers to this process as seamless integration of multi-GPU rendering.

FIG. 7 is a block diagram illustration of an exemplary system 700 for implementing seamless integration of multi-GPU rendering in accordance with the present invention. The system 700 includes an operating system render engine 702, which can include, as an example, Open Graphics Language (OpenGL), Direct3D, or many others that are well known to those of skill in the art. The system 700 effectively hides, from each GPU in a multi-GPU environment, the presence of all of the other simultaneously running GPUs.

One conventional approach for performing multi-GPU rendering includes designing the driver itself to be "multi-GPU aware." In this manner, the driver is able to recognize the need to render one thing to one part of one GPU and to render the other thing to another GPU. Embodiments of the present invention, however, avoid the need to redesign or reconfigure the drivers to perform multi-GPU rendering. Instead, embodiments of the present invention permit the use of less complicated off the shelf (i.e., turn key) drivers for multi-GPU rendering.

In the system 700, for example, the intelligence designed into conventional multi-GPU capable drivers is instead moved to an abstraction layer 704. Consequently, each of the GPUs in the system 700 (e.g., GPU 1, GPU 2, . . . GPU n) believes that it is the only GPU rendering a particular scene. That is, GPU 1 is unaware that GPUs 2 . . . GPU n are also rendering the same scene. This approach avoids the need to build this level of multi-GPU intelligence into the drivers. As a result, the complexity of the driver can be reduced by not building in special paths to accommodate multi-GPU rendering.

In the exemplary system 700 FIG. 7, the abstraction layer 704 includes a module 706 to perform an initial set-up based upon an predefined profile. By way of example, this predefined profile might stipulate, for a particular video game, that the screen should be split in half. In this example, the initial setup module 706 helps ensure that memory maps in the GPUs are substantially identical. The initial set-up process can also be used to support scissoring, as illustrated in FIG. 8.

FIG. 8 is a block diagram illustration of a system 800 for performing scissoring in accordance with an embodiment of the present invention. In FIG. 8, a master GPU A 802 and a slave GPU B 804 are used in a multi-GPU configuration to render an image 806 using scissoring. In the example system 800, the master GPU A 802 and the slave GPU B 804 render first and second halves 808 and 810 of the image 806, respectively. These halves are later combined to form the entire image 806.

Through scissoring, each of the GPUs 802 and 804 actually renders the entire image. However, the initial set-up module 706 of FIG. 7 enables the image to be masked such that only half of the image gets written out from each of the GPUs 802 and 804. Each of the GPUs 802 and 804, however, believes that it is solely rendering and writing the entire image 806. The abstraction layer 704 masks the presence of each of the GPUs from the other GPUs, as indicated above. This approach provides a substantial performance improvement in writing the image data and also saves time.

In embodiments the present invention, scissor commands can be placed in the command buffer such that when the same command stream is executed on GPU i, it sets the appropriate scissor for that particular GPU instance. In order for this mechanism to work, the command processor should be able to handle conditionals in the command stream. As an example, the scissor can look as follows:

```
If(*isGPU[0] == 1)
{
    Set scissor for GPU0 coverage
}
If(isGPU[i] == 1)
{
    Set scissor for GPUi coverage
}
If(isGPU[N-1] == 1)
{
    Set scissor for GPUN-1 coverage
}
```

The coverage percentage for each GPU instance can vary based upon optimal load. Only one of the above conditions will holds true for any given GPU instance as each GPU has a unique boolean identifier.

In embodiments of the present invention, scissoring can also be used to set the GPUs to perform different ratios. For example, one GPU may be able to render faster than others. Thus, the faster GPU can be directed to render two frames while a slower GPU renders one frame. This approach, for example, is similar to a technique known to those of skill in the art as alternative frame ratio (AFR). In embodiments of the present invention, however, scissoring can be used to determine how the GPU frames will be rendered in order for the GPUs to efficiently run in parallel.

Referring back to FIG. 7, the abstraction layer 704 also includes an application profile module 708 and a scene analysis module 710, which are respectively used to develop rendering profiles and perform scene change analysis as described above. Also included is a render statistics module 712, used to compile render statistics, as noted in relation to FIG. 6. Finally, an optimize configuration module 714 is included to process data received from the application profile module 708, the scene analysis module 710, and the render statistics module 712. The optimize configuration module 714 analyzes this data to dynamically create the optimized rendering profiles discussed above. The optimized rendering profiles are ultimately used to form the GPU boundaries (e.g., 302, 304, 308, 310, and 312 of FIGS. 3A-3C).

To achieve optimal performance, the driver in the system 700, for example, dynamically creates a measuring window (period) in which the driver determines optimal scissor parameters for each GPU. Exemplary parameters are:

i. Scissor Rectangle (simple case might be horizontal vs vertical);
ii. Coverage percentage for each GPU instance; and
iii. (AFR) Alternate Frame Ratio for each GPU (1:1:1:1, 2:1:1:2, ... ).

During the measurement period, the driver incrementally adjusts the parameters and record the GPU's performance feedback (i.e., gathered statistics). At the end of the measurement period, the results are analyzed and the optimal scissor (ratio) configuration is set before another round of performance data gathering is conducted.

The search for optimal configurations can be optimized and modified in multiple ways to eliminate the search time required to update the performance score table(s). One optimization is to use the previous optimal setting and only perform a limited search around these settings. Another possible optimization is to use the current application knowledge to limit the search to specific parameters, or to start with a predefined set.

CONCLUSION

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

For example, various aspects of the present invention can be implemented by software, firmware, hardware (or hardware represented by software such as, for example, Verilog or hardware description language instructions), or a combination thereof. After reading this description, it will become apparent to a person skilled in the relevant art how to implement the invention using other computer systems and/or computer architectures.

It should be noted that the simulation, synthesis and/or manufacture of the various embodiments of this invention can be accomplished, in part, through the use of computer readable code, including general programming languages (such as C or C++), hardware description languages (HDL) including Verilog HDL, VHDL, Altera HDL (AHDL) and so on, or other available programming and/or schematic capture tools (such as circuit capture tools).

This computer readable code can be disposed in any known computer usable medium including semiconductor, magnetic disk, optical disk (such as CD-ROM, DVD-ROM) and as a computer data signal embodied in a computer usable (e.g., readable) transmission medium. As such, the code can be transmitted over communication networks including the Internet and intranets. It is understood that the functions accomplished and/or structure provided by the systems and techniques described above can be represented in a core (such as a GPU core) that is embodied in program code and can be transformed to hardware as part of the production of integrated circuits.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A computing system, comprising:
a unified command buffer, wherein the unified command buffer is found in system memory and enables each of the processors to similarly view system memory thereby permitting the processors to share the same system memory; and
a plurality of processors configured to access one or more instructions stored in the unified buffer, wherein each processor is coupled to the unified command buffer, wherein the one or more instructions stored in the unified command buffer contain an indication that designates each instruction for a particular processor;
wherein each processor of the plurality of processors is further configured to read each instruction stored in the unified command buffer having an indication for the processor;
wherein each processor of the plurality of processors is further configured to implement virtual memory (VM) such that the underlying physical resources of the unified command buffer are located in different physical locations.

2. The computing system of claim 1, wherein the unified command buffer is implemented within a kernel driver layer of the system memory.

3. The computing system of claim 1, wherein the unified command buffer is located identically in the system memory for all of the plurality of processors.

4. The computing system of claim 3, wherein specific ranges of the system memory are associated with specific ones of the plurality of processors.

5. The computing system of claim 1, wherein predications tag each instruction to at least one of the plurality of processors.

6. The computing system of claim 1, wherein retirement information regarding commands in the unified command buffer are shared among the plurality of processors.

7. The computing system of claim 1, wherein each of the plurality of processors further comprises a direct command buffer ring or an indirect command buffer ring.

8. The computing system of claim 7, wherein the indirect command buffer ring includes references to further command buffers.

9. The computing system of claim 1, wherein the plurality of processors include at least one from the group including graphics processing units (GPUs) and central processing units (CPUs).

10. A method for processing, comprising:
storing one or more instructions in a unified command buffer that is coupled to a plurality of processors, wherein the unified command buffer is found in system memory and enables each of the processors to similarly view system memory thereby permitting the processors to share the same system memory;
accessing the one or more instruction stored in the unified command buffer by each of the plurality of processors, wherein the one or more instructions stored in the unified command buffer contain an indication that designates each instruction for a particular processor;
reading, by each processor, each instruction stored in the unified command buffer having an indication for the processor; and
implementing virtual memory (VM) in each processor of the plurality of processors such that the underlying physical resources of the unified command buffer are located in different physical locations.

11. The method of claim 10, further comprising:
implementing the unified command buffer within a kernel driver layer of the system memory.

12. The method of claim 10, further comprising:
identically locating the unified command buffer in the system memory for all of the plurality of processors.

13. The method of claim 10, further comprising:
associating specific ranges of the system memory with specific ones of the plurality of processors.

14. The method of claim 10, further comprising:
predication tagging each instruction to at least one of the plurality of processors.

15. The method of claim 10, further comprising:
sharing retirement information regarding commands in the unified command buffer among the plurality of processors.

16. The method of claim 10, wherein each of the plurality of processors further comprises a direct command buffer ring or an indirect command buffer ring.

17. The method of claim 16, wherein the indirect command buffer ring includes references to further command buffers.

18. The method of claim 10, wherein the plurality of processors include at least one from the group including graphics processing units (GPUs) and central processing units (CPUs).

* * * * *